(12) United States Patent
Gorenz et al.

(10) Patent No.: US 11,970,981 B2
(45) Date of Patent: Apr. 30, 2024

(54) PLANETARY GEARBOX

(71) Applicant: Rolls-Royce Deutschland Ltd & Co KG, Blankenfelde-Mahlow (DE)

(72) Inventors: Paul Gorenz, Berlin (DE); Hannes Wuestenberg, Berlin (DE); Jan Schwarze, Berlin (DE)

(73) Assignee: ROLLS-ROYCE DEUTSCHLAND LTD & CO. KG, Blankenfelde-Mahlow (DE)

( * ) Notice: Subject to any disclaimer, the term of this patent is extended or adjusted under 35 U.S.C. 154(b) by 138 days.

(21) Appl. No.: 17/405,869

(22) Filed: Aug. 18, 2021

(65) Prior Publication Data
US 2022/0065172 A1    Mar. 3, 2022

(30) Foreign Application Priority Data

Aug. 27, 2020 (DE) ..................... 10 2020 122 430.3

(51) Int. Cl.
*F02C 7/36* (2006.01)
*F16H 1/28* (2006.01)
*F16H 1/32* (2006.01)

(52) U.S. Cl.
CPC ................. *F02C 7/36* (2013.01); *F16H 1/28* (2013.01); *F05D 2220/36* (2013.01); *F05D 2260/40311* (2013.01); *F16H 2001/325* (2013.01)

(58) Field of Classification Search
CPC ............. F02C 7/36; F05D 2260/40311; F16H 2001/325
See application file for complete search history.

(56) References Cited

U.S. PATENT DOCUMENTS

| 1,425,430 A | 8/1922 | Ragnar et al. |
| 4,601,590 A * | 7/1986 | Arii .......................... F16C 27/02 384/906 |

(Continued)

FOREIGN PATENT DOCUMENTS

| DE | 2240154 A1 | 2/1974 |
| DE | 3530558 A1 | 3/1986 |

(Continued)

OTHER PUBLICATIONS

German Search Report dated Apr. 30, 2021 from counterpart German Patent Application No. 10 2020 122 430.3.

*Primary Examiner* — Justin D Seabe
*Assistant Examiner* — John S Hunter, Jr.
(74) *Attorney, Agent, or Firm* — SHUTTLEWORTH & INGERSOLL, PLC; Timothy J. Klima

(57) ABSTRACT

A planetary gear box (and method of assembly), where the gear box includes a sun gear, a plurality of planet gears, a ring gear, a plurality of planet pins, an axially forward carrier plate and an axially rearward carrier plate. Each planet pin is fixed respectively at its axially forward end on the axially forward carrier plate and at its axially rearward end on the axially rearward carrier plate of the planetary gear box. The planet pin is of two-part design and forms a radially outer pin part and a radially inner pin part, which are connected to one another in a manner precluding relative rotation therebetween, wherein the radially outer pin part forms a bearing with the planet gear, and only the radially inner pin part is fixed at its axial ends to the forward and rearward carrier plates.

19 Claims, 8 Drawing Sheets

(56) References Cited

U.S. PATENT DOCUMENTS

| | | | |
|---|---|---|---|
| 9,353,690 B2 * | 5/2016 | Makulec | F02C 7/277 |
| 9,878,501 B2 * | 1/2018 | Zatorski | B29C 70/34 |
| 2019/0360356 A1 | 11/2019 | Savaria et al. | |

FOREIGN PATENT DOCUMENTS

| | | |
|---|---|---|
| DE | 102014110907 A1 | 2/2016 |
| DE | 102015201248 B3 | 6/2016 |
| DE | 102016219800 A1 | 4/2017 |
| DE | 102017127876 A1 | 5/2019 |
| DE | 102019204507 A1 | 10/2020 |
| EP | 3284975 A1 | 2/2018 |
| GB | 612883 A | 11/1948 |

* cited by examiner

PLANETARY GEARBOX

CROSS-REFERENCE TO RELATED APPLICATIONS

This application claims priority to German Patent Application DE102020122430.3 filed Aug. 27, 2020, the entirety of which is incorporated by reference herein.

BACKGROUND OF THE INVENTION

The invention relates to a planetary gear box according to the present disclosure, and to a method for the assembly of a planetary gear box of said type.

There is a known practice of coupling the fan of a gas turbine engine to a turbine shaft via a planetary gear box, wherein the planetary gear box receives an input from the turbine shaft and outputs drive for the fan so as to drive the fan at a lower rotational speed than the turbine shaft. The planetary gear box comprises planet gears, which are driven by a sun gear and which revolve in a ring gear. Arranged in each of the planet gears is a planet pin, wherein the planet pins are fixed at their axial ends on an axially forward and an axially rearward carrier plate of a planet carrier. The planet carrier is coupled to a drive for the fan. A planetary gear box of this kind is known for example from DE 10 2017 127 876 A1.

It may be desirable to design the planet pins with an outside diameter which is as large as possible in order to improve the load bearing capacity of the planet pins. However, implementing planet pins with a relatively large outside diameter leads to the problem that a correspondingly large hole for the passage of the planet pin during assembly has to be formed in at least one of the carrier plates of the planetary gear box. This has a disadvantageous effect on the rigidity of the carrier plate. The required rigidity of the carrier plate thus restricts the possibilities for the dimensioning of the planet pins.

BRIEF SUMMARY OF THE INVENTION

It is the underlying object of the invention to provide a planetary gear box which can implement planet pins of large diameters without having a disadvantageous effect on the rigidity of the carrier plates in which the planet pins are fixed. It is furthermore sought to provide a method for the effective assembly of a planetary gear box.

This object is achieved by a planetary gear box and by a method having features as disclosed herein. Refinements of the invention are also indicated in the present disclosure.

Accordingly, the present invention considers, according to a first aspect of the invention, a planetary gear box which has a sun gear, which rotates about an axis of rotation of the planetary gear box and can be driven by a sun shaft, wherein the axis of rotation defines an axial direction of the planetary gear box. A plurality of planet gears, which are driven by the sun gear, and a ring gear, with which the plurality of planet gears is in engagement, are provided. The planetary gear box furthermore comprises a plurality of planet pins, wherein a planet pin is in each case arranged in a planet gear, and the planet pin and the planet gear form a bearing, as well as an axially forward carrier plate and an axially rearward carrier plate, wherein the planet pin is fixed at its axially forward end on the axially forward carrier plate and at its axially rearward end on the axially rearward carrier plate of the planetary gear box.

It is envisaged that the planet pin is of two-part design and forms a radially outer pin part and a radially inner pin part, which are connected to one another in a manner precluding relative rotation therebetween, wherein the radially outer pin part forms a bearing with the planet gear, and only the radially inner pin part is fixed at its axial ends to the forward and rearward carrier plates. This connection is made, in particular, by fixing the axial ends of the radially inner pin part in axially forward and axially rearward fixing openings in the axially forward and axially rearward carrier plate.

The invention is based on the concept of implementing a relatively large outside diameter of the planet pin at the same time as a small diameter of the fixing openings formed in the carrier plates by forming the planet pin in two parts with a radially outer pin part, which can be implemented with a large outside diameter, and a radially inner pin part, which has a smaller outside diameter, wherein only the radially inner pin part is used for fixing to the carrier plates.

The solution according to the invention makes it possible to provide a planet pin that has an outside diameter which is larger than the diameter of the fixing openings in the carrier plate and, at the same time, to preserve a high rigidity of the carrier plates since only the radially inner pin part having the smaller outside diameter is fixed on the carrier plates. Accordingly, the fixing openings formed in the carrier plates can be provided with a correspondingly smaller diameter. This in turn enables the carrier plates to be made thinner and, as a result, enables weight to be saved while the rigidity remains the same. This is also associated with the advantage of easier assembly.

Another advantage associated with the invention consists in that the design options in the configuration and dimensioning of the planet pin are increased since they can be implemented on the radially outer pin part without affecting or changing the connection to the carrier plates, which is implemented by the radially inner pin part.

Another advantage associated with the invention consists in that, when the bearing between the planet pin and the planet gear is worn, only the radially outer pin part has to be replaced.

Another advantage associated with the invention consists in that the axial rigidity of the planet pin can be optimized. Thus, the resulting bearing load on the radially outer pin part in the circumferential and axial directions may be nonuniform, as a result of which it may be deformed in different ways. This deformation can have a disadvantageous effect on general bearing functionality and performance. By means of a specialized configuration of the connection between the radially inner and radially outer pin parts, it is possible to optimize the axial rigidity distribution of the outer pin part (embodied as a plain bearing ring, for example) in order to compensate for disadvantageous deformations and thus improve general bearing functionality and performance. The connection can be implemented by means of one or more webs, for example, as will be explained below, and these can differ in dimensions and axial position. By means of this variant, it is possible for example to improve the deflection curve and reduce the risk of edge loading (in the plain bearing). Another variant of the connection between the inner and outer pin parts can form a type of spherical plain bearing, for example, which can better compensate for skewed positioning of the bearings.

The radially outer pin part forms an outer surface or outer circumferential surface that forms the bearing surface of the planet pin, which forms a bearing with the inner surface of the hole formed in the planet gear. The bearing can be a plain bearing or a rolling bearing.

One embodiment of the invention envisages that the axial ends of the radially outer pin part extend as far as the respective carrier plate. The radially outer pin part thus fills the entire space between the two carrier plates. In this case, provision can be made for the axial ends of the radially outer pin part to be connected to the respective carrier plate via means which prevent relative rotation. The connection precluding relative rotation between the radially outer pin part and the carrier plates, which is provided indirectly by way of the connection of the radially inner pin part to the carrier plates, is thereby supplemented by a direct connection. This makes it possible to precisely define radially the alignment and position of the radially outer pin part as well as the outer surface thereof which forms the bearing surface of the planet pin.

In this case, the connection between the radially outer pin part and the carrier plates is provided by a slot and key joint, a tendon joint or by pins or ribs on the end face of the radially outer pin part, which engage in recesses, grooves or slots in the carrier plate or vice versa.

Another embodiment of the invention envisages that the axial ends of the radially outer pin part are arranged at a distance from the respective carrier plate. In this case, the radially outer pin part thus does not fill the entire space between the two carrier plates.

One embodiment envisages that the radially outer pin part rests over its entire length by means of its inner surface against the outer surface of the radially inner pin part. The radially inner pin part and the radially outer pin part are thus in engagement with one another over the entire length of the radially outer pin part.

In an alternative embodiment, in contrast, it is envisaged that the radially inner pin part and the radially outer pin part are connected to one another by means of at least one radially extending web. The axial length thereof is less than the axial length of the radially outer pin part, and therefore the two pin parts are not connected to one another over their entire length. This makes it possible to provide partial regions of the radially outer pin part with a different rigidity and to make them easier to deform, e.g. the axial end regions of the radially outer pin part, thus ensuring that the planet pin conforms better to the planet gear and a more uniform bearing (e.g. plain bearing) can be formed over the entire axial length of the bearing.

In this case, provision can be made for the radially inner pin part and the radially outer pin part to be connected to one another by means of at least two webs, which are spaced apart axially. The at least two webs can be arranged spaced apart from the axial ends of the radially outer pin part. Alternatively, provision can be made for at least one web to coincide with one axial end of the outer pin part.

The at least one web can be arranged symmetrically or asymmetrically with respect to the axial center between the two axial ends of the pin parts or with respect to the axial center between the forward carrier plate and the rearward carrier plate. Another variant embodiment envisages that, where there are at least two webs, these are of different dimensions, e.g. have a different axial extent or width.

If there is a plurality of webs, provision can be made for at least two of the webs to form between them a cavity for holding oil and components relevant to the oil system. A hole leads from the cavity, through the radially outer pin part, to the outer surface of the radially outer pin part in order to supply the bearing with oil. In this case, the cavity can be formed as a partially circumferential cavity or annular channel. The cavity can be part of an oil system and can be used to supply the bearing. Such a specialized configuration of the cavities and oil routing makes it possible inter alia to cool the planet pin from the inside. It is furthermore possible to insert additional components relevant to the oil system, e.g. filters, screens, seals and/or restrictors, into such cavities, thereby making it possible either to improve the quality of the oil introduced into the bearing (e.g. by filtration of contaminants that could cause damage to the bearing) and/or to set the feed quantity or pressure correctly.

The at least one web can be formed integrally with the radially inner pin part or integrally with the radially outer pin part. In the case of a plurality of webs, provision can be made for at least one web to be formed integrally with the radially inner pin part, and at least one web to be formed integrally with the radially outer pin part.

The connection precluding relative rotation between the radially inner pin part and the radially outer pin part is implemented by means of an interference fit, for example, for which purpose provision can be made for the inside diameter of the radially outer pin part to be slightly smaller than the outside diameter of the radially inner pin part. Alternatively, provision can be made for the radially inner pin part and the radially outer pin part to be connected to one another positively in a manner precluding relative rotation therebetween, e.g. via a splined joint, or for the radially inner pin part and the radially outer pin part to be connected to one another materially.

For this purpose, one embodiment envisages that the radially inner pin part and the radially outer pin part have mutually corresponding structures such that they can be moved relative to one another in the axial direction during the assembly of the planetary gear box.

The radially inner pin part can be of internally hollow, e.g. hollow-cylindrical, design or, alternatively, can be of partially or completely solid design. It can be fixedly connected to the respective carrier plate in the same way or in different ways at both of its axial ends. In this case, provision can be made for the fixing openings formed in the carrier plates to have the same diameter or a different diameter, wherein, in the second case, the axial ends of the radially inner pin also have a different outside diameter.

The radially outer pin part and the radially inner pin part can be composed of the same material or of a different material. In this case, there may be various requirements on the inner and outer pin parts, e.g. different requirements in terms of strength or rigidity levels. To meet these requirements, it may be expedient to manufacture both planet pin parts from different materials or to use different material treatment processes.

Another embodiment of the invention envisages that a protection mechanism, which releases the connection precluding relative rotation between the radially inner pin part and the radially outer pin part if a certain relative torque between the radially inner pin part and the radially outer pin part is reached, is integrated into the planetary gear box. In this case, the connection, e.g. positive engagement by means of a parallel key, positive engagement implemented in some other way, or frictional engagement, can be designed in such a way that rotation of the two bearing pin parts relative to one another is allowed if there is a fault and the relative torque exceeds the predefined value.

In the case of a plain bearing, a fault is produced by the planet gear and the radially outer pin part coming into contact due to high deformation, for example. The heat generated in this case can lead to jamming or even to welding of the plain bearing, with the result that the planet gear no longer rotates or rotates only to a reduced extent relative to the radially outer pin part. In this case, the protection mechanism forms a kind of predetermined breaking point. By means of the protection mechanism, it is possible to considerably reduce the risk of consequential damage in the planetary gear box and breakout of high-energy parts from the engine.

In this context, a further embodiment envisages that said protection mechanism is used to detect the damage in the planetary gear box or gas turbine engine associated with the triggering of the protection mechanism. For this purpose, the planet pin is assigned detection means, which directly or indirectly detect a relative movement between the radially inner pin part and the radially outer pin part. The detection means can be provided, for example, in a fully or intermittently opening oil circuit for supplying oil to the bearing (e.g. in the form of a pressure sensor), wherein the detection means measure a pressure drop or pressure fluctuations in the oil circuit. By means of such an embodiment, it is possible, for the sake of early fault detection, to determine damage which leads to a pressure drop or to pressure fluctuations in the oil system of the engine.

The invention also relates to a gas turbine engine for an aircraft, which has:
- an engine core which comprises a turbine, a compressor and a core shaft connecting the turbine to the compressor and formed as a hollow shaft;
- a fan, which is positioned upstream of the engine core, wherein the fan comprises a plurality of fan blades and is driven by a fan shaft; and
- a planetary gear box according to the present disclosure, the input of which is connected to the turbine shaft and the output of which is connected to the fan shaft.
- One design embodiment in this regard may provide that the turbine is a first turbine, the compressor is a first compressor, and the turbine shaft is a first turbine shaft;
- the engine core further comprises a second turbine, a second compressor, and a second turbine shaft which connects the second turbine to the second compressor; and
- the second turbine, the second compressor, and the second turbine shaft are disposed with a view to rotating at a higher rotational speed than the first turbine shaft.

According to another aspect of the invention, the invention relates to a method for assembling a planetary gear box, which has a sun gear, a plurality of planet gears, a ring gear, a plurality of planet pins, which are of two-part design and comprise a radially outer pin part and a radially inner pin part, as well as an axially forward carrier plate and an axially rearward carrier plate. The method envisages that, in the case of each pair of a planet gear and a planet pin, the radially outer pin part is introduced into the axial opening of the planet gear. The planet gear is then positioned between the forward carrier plate and the rearward carrier plate in the planetary gear box. After this, the radially inner pin part is introduced into the radially outer pin part and fixed to the forward and rearward carrier plates at its axial ends.

The method makes it possible to support a planet gear on a planet pin whose outside diameter is larger than that of the fixing openings formed in the carrier plates.

It is pointed out that the present invention is described with reference to a cylindrical coordinate system which has the coordinates x, r, and p. Here, x indicates the axial direction, r indicates the radial direction, and p indicates the angle in the circumferential direction. The axial direction here is identical with the engine axis of the gas turbine engine in which the planetary gear box is contained, wherein the axial direction is that from the engine inlet in the direction of the engine outlet. Proceeding from the x-axis, the radial direction points radially outward. Terms such as "in front of", "behind", "front", and "rear" refer to the axial direction, or the flow direction in the engine. Terms such as "outer" or "inner" relate to the radial direction.

As noted elsewhere herein, the present disclosure may relate to a gas turbine engine. Such a gas turbine engine may comprise an engine core which comprises a turbine, a combustion chamber, a compressor, and a core shaft that connects the turbine to the compressor. Such a gas turbine engine may comprise a fan (having fan blades) which is positioned upstream of the engine core.

Arrangements of the present disclosure can be particularly, although not exclusively, beneficial for fans that are driven via a gear box. Accordingly, the gas turbine engine may comprise a gear box that receives an input from the core shaft and outputs drive for the fan so as to drive the fan at a lower rotational speed than the core shaft. The input to the gear box may be performed directly from the core shaft or indirectly from the core shaft, for example via a spur shaft and/or a spur gear. The core shaft may be rigidly connected to the turbine and the compressor, such that the turbine and the compressor rotate at the same rotational speed (wherein the fan rotates at a lower rotational speed).

The gas turbine engine as described and/or claimed herein may have any suitable general architecture. For example, the gas turbine engine may have any desired number of shafts, for example one, two or three shafts, that connect turbines and compressors. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft which connects the second turbine to the second compressor. The second turbine, second compressor and second core shaft may be arranged so as to rotate at a higher rotational speed than the first core shaft.

In such an arrangement, the second compressor may be positioned so as to be axially downstream of the first compressor. The second compressor may be arranged so as to receive (for example directly receive, for example via a generally annular duct) flow from the first compressor.

The gear box may be arranged so as to be driven by that core shaft (for example the first core shaft in the example above) which is configured to rotate (for example during use) at the lowest rotational speed. For example, the gear box may be arranged so as to be driven only by that core shaft (for example only by the first core shaft, and not the second core shaft, in the example above) which is configured to rotate (for example during use) at the lowest rotational speed. Alternatively thereto, the gear box may be arranged so as to be driven by one or a plurality of shafts, for example the first and/or the second shaft in the example above.

In the case of a gas turbine engine as described and/or claimed herein, a combustion chamber may be provided axially downstream of the fan and of the compressor(s). For example, the combustion chamber can lie directly downstream of the second compressor (for example at the exit of the latter), if a second compressor is provided. By way of further example, the flow at the exit of the compressor may be supplied to the inlet of the second turbine, if a second turbine is provided. The combustion chamber may be provided upstream of the turbine(s).

The or each compressor (for example the first compressor and the second compressor as described above) may comprise any number of stages, for example multiple stages. Each stage may comprise a row of rotor blades and a row of stator blades, which may be variable stator blades (in the sense that the angle of incidence of said variable stator blades may be variable). The row of rotor blades and the row of stator blades may be axially offset from one another.

The or each turbine (for example the first turbine and the second turbine as described above) may comprise any number of stages, for example multiple stages. Each stage may comprise a row of rotor blades and a row of stator blades. The row of rotor blades and the row of stator blades may be axially offset from one another.

Each fan blade may be defined as having a radial span extending from a root (or a hub) at a radially inner location flowed over by gas, or at a 0% span width position, to a tip at a 100% span width position. The ratio of the radius of the fan blade at the hub to the radius of the fan blade at the tip may be less than (or of the order of): 0.4, 0.39, 0.38, 0.37, 0.36, 0.35, 0.34, 0.33, 0.32, 0.31, 0.3, 0.29, 0.28, 0.27, 0.26 or 0.25. The ratio of the radius of the fan blade at the hub to the radius of the fan blade at the tip may be in an inclusive range delimited by two of the values in the previous sentence (that is to say that the values may form upper or lower limits). These ratios may be referred to in general as the hub-to-tip ratio. The radius at the hub and the radius at the tip can both be measured at the leading periphery part (or the axially frontmost periphery) of the blade. The hub-to-tip ratio refers, of course, to that portion of the fan blade which is flowed over by gas, that is to say the portion that is situated radially outside any platform.

The radius of the fan can be measured between the engine centerline and the tip of the fan blade at the leading periphery of the latter. The diameter of the fan (which can simply be double the radius of the fan) may be larger than (or of the order of): 250 cm (approximately 100 inches), 260 cm, 270 cm (approximately 105 inches), 280 cm (approximately 110 inches), 290 cm (approximately 115 inches), 300 cm (approximately 120 inches), 310 cm, 320 cm (approximately 125 inches), 330 cm (approximately 130 inches), 340 cm (approximately 135 inches), 350 cm, 360 cm (approximately 140 inches), 370 cm (approximately 145 inches), 380 cm (approximately 150 inches), or 390 cm (approximately 155 inches). The fan diameter may be in an inclusive range delimited by two of the values in the previous sentence (that is to say that the values may form upper or lower limits).

The rotational speed of the fan may vary during use. Generally, the rotational speed is lower for fans with a comparatively large diameter. Purely by way of non-limiting example, the rotational speed of the fan under cruise conditions may be less than 2500 rpm, for example less than 2300 rpm. Purely by way of a further non-limiting example, the rotational speed of the fan under cruise conditions for an engine having a fan diameter in the range from 250 cm to 300 cm (for example 250 cm to 280 cm) may also be in the range from 1700 rpm to 2500 rpm, for example in the range from 1800 rpm to 2300 rpm, for example in the range from 1900 rpm to 2100 rpm. Purely by way of a further non-limiting example, the rotational speed of the fan under cruise conditions for an engine having a fan diameter in the range from 320 cm to 380 cm may be in the range from 1200 rpm to 2000 rpm, for example in the range from 1300 rpm to 1800 rpm, for example in the range from 1400 rpm to 1600 rpm.

During use of the gas turbine engine, the fan (with associated fan blades) rotates about an axis of rotation. This rotation results in the tip of the fan blade moving with a velocity $U_{tip}$. The work done by the fan blades on the flow results in an enthalpy rise dH in the flow. A fan tip loading can be defined as $dH/U_{tip}^2$, where dH is the enthalpy rise (for example the 1-D average enthalpy rise) across the fan and $U_{tip}$ is the (translational) velocity of the fan tip, for example at the leading periphery of the tip (which can be defined as the fan tip radius at the leading periphery multiplied by the angular velocity). The fan tip loading at cruise conditions may be more than (or of the order of): 0.3, 0.31, 0.32, 0.33, 0.34, 0.35, 0.36, 0.37, 0.38, 0.39, or 0.4 (wherein all units in this passage are $Jkg^{-1}K^{-1}/(ms^{-1})^2$). The fan tip loading may be in an inclusive range delimited by two of the values in the previous sentence (that is to say that the values may form upper or lower limits).

Gas turbine engines in accordance with the present disclosure can have any desired bypass ratio, where the bypass ratio is defined as the ratio of the mass flow rate of the flow through the bypass duct to the mass flow rate of the flow through the core at cruise conditions. In the case of some arrangements, the bypass ratio can be more than (or of the order of): 10, 10.5, 11, 11.5, 12, 12.5, 13, 13.5, 14, 14.5, 15, 15.5, 16, 16.5, or 17. The bypass ratio may be in an inclusive range delimited by two of the values in the previous sentence (that is to say that the values may form upper or lower limits). The bypass duct may be substantially annular. The bypass duct may be situated radially outside the engine core. The radially outer surface of the bypass duct may be defined by an engine nacelle and/or a fan casing.

The overall pressure ratio of a gas turbine engine as described and/or claimed herein can be defined as the ratio of the stagnation pressure upstream of the fan to the stagnation pressure at the exit of the highest pressure compressor (before entry into the combustion chamber). As a non-limiting example, the overall pressure ratio of a gas turbine engine as described and/or claimed herein at cruising speed may be greater than (or of the order of): 35, 40, 45, 50, 55, 60, 65, 70, 75. The overall pressure ratio may be in an inclusive range delimited by two of the values in the previous sentence (that is to say that the values may form upper or lower limits).

The specific thrust of an engine can be defined as the net thrust of the engine divided by the total mass flow through the engine. The specific thrust of an engine as described and/or claimed herein at cruise conditions may be less than (or of the order of): 110 $Nkg^{-1}$ s, 105 $Nkg^{-1}$ s, 100 $Nkg^{-1}$ s, 95 $Nkg^{-1}$ s, 90 $Nkg^{-1}$ s, 85 $Nkg^{-1}$ s or 80 $Nkg^{-1}$ s. The specific thrust may be in an inclusive range delimited by two of the values in the previous sentence (that is to say that the values may form upper or lower limits). Such engines can be particularly efficient in comparison with conventional gas turbine engines.

A gas turbine engine as described and/or claimed herein may have any desired maximum thrust. Purely by way of a non-limiting example, a gas turbine as described and/or claimed herein may be capable of generating a maximum thrust of at least (or of the order of): 160 kN, 170 kN, 180 kN, 190 kN, 200 kN, 250 kN, 300 kN, 350 kN, 400 kN, 450 kN, 500 kN, or 550 kN. The maximum thrust may be in an inclusive range delimited by two of the values in the previous sentence (that is to say that the values may form upper or lower limits). The thrust referred to above may be the maximum net thrust at standard atmospheric conditions at sea level plus 15 degrees C. (ambient pressure 101.3 kPa, temperature 30 degrees C.) in the case of a static engine.

During use, the temperature of the flow at the entry to the high-pressure turbine can be particularly high. This temperature, which can be referred to as TET, may be measured at the exit to the combustion chamber, for example directly upstream of the first turbine blade, which in turn can be referred to as a nozzle guide blade. At cruising speed, the TET may be at least (or of the order of): 1400 K, 1450 K, 1500 K, 1550 K, 1600 K, or 1650 K. The TET at constant speed may be in an inclusive range delimited by two of the values in the previous sentence (that is to say that the values may form upper or lower limits). The maximum TET in the use of the engine may be at least (or of the order of), for example: 1700 K, 1750 K, 1800 K, 1850 K, 1900 K, 1950 K, or 2000 K. The maximum TET may be in an inclusive range delimited by two of the values in the previous sentence (that is to say that the values may form upper or lower limits). The maximum TET may occur, for example, under a high thrust condition, for example under a maximum take-off thrust (MTO) condition.

A fan blade and/or an airfoil portion of a fan blade described and/or claimed herein may be manufactured from any suitable material or a combination of materials. For example, at least a part of the fan blade and/or of the airfoil can be manufactured at least in part from a composite, for example a metal matrix composite and/or an organic matrix composite, such as carbon fiber. By way of further example, at least a part of the fan blade and/or of the airfoil can be manufactured at least in part from a metal, such as a titanium-based metal or an aluminum-based material (such as an aluminum-lithium alloy) or a steel-based material. The fan blade may comprise at least two regions which are manufactured using different materials. For example, the fan blade may have a protective leading periphery, which is manufactured using a material that is better able to resist impact (for example of birds, ice, or other material) than the rest of the blade. Such a leading periphery may, for example, be manufactured using titanium or a titanium-based alloy. Thus, purely by way of example, the fan blade may have a carbon-fiber-based or aluminum-based body (such as an aluminum-lithium alloy) with a titanium leading periphery.

A fan as described and/or claimed herein may comprise a central portion, from which the fan blades may extend, for example in a radial direction. The fan blades may be attached to the central portion in any desired manner. For example, each fan blade may comprise a fixing device which can engage with a corresponding slot in the hub (or disk). Purely by way of example, such a fixing device may be in the form of a dovetail that can be inserted into and/or engage with a corresponding slot in the hub/disk in order for the fan blade to be fixed to the hub/disk. By way of further example, the fan blades can be formed integrally with a central portion. Such an arrangement may be referred to as a blisk or a bling. Any suitable method may be used to manufacture such a blisk or such a bling. For example, at least some of the fan blades can be machined from a block and/or at least some of the fan blades can be attached to the hub/disk by welding, such as linear friction welding, for example.

The gas turbine engines described and/or claimed herein may or may not be provided with a variable area nozzle (VAN). Such a variable area nozzle can allow the exit cross section of the bypass duct to be varied during use. The general principles of the present disclosure can apply to engines with or without a VAN.

The fan of a gas turbine as described and/or claimed herein may have any desired number of fan blades, for example 16, 18, 20 or 22 fan blades.

As used herein, cruise conditions can mean cruise conditions of an aircraft to which the gas turbine engine is attached. Such cruise conditions can be conventionally defined as the conditions at mid-cruise, for example the conditions experienced by the aircraft and/or the engine between (in terms of time and/or distance) the top of climb and the start of descent.

Purely by way of example, the forward speed at the cruise condition can be any point in the range of from Mach 0.7 to 0.9, for example 0.75 to 0.85, for example 0.76 to 0.84, for example 0.77 to 0.83, for example 0.78 to 0.82, for example 0.79 to 0.81, for example of the order of Mach 0.8, of the order of Mach 0.85 or in the range of from 0.8 to 0.85. Any arbitrary speed within these ranges can be the constant cruise condition. In the case of some aircraft, the constant cruise conditions may be outside these ranges, for example below Mach 0.7 or above Mach 0.9.

Purely by way of example, the cruise conditions may correspond to standard atmospheric conditions at an altitude that is in the range from 10,000 m to 15,000 m, for example in the range from 10,000 m to 12,000 m, for example in the range from 10,400 m to 11,600 m (around 38,000 ft), for example in the range from 10,500 m to 11,500 m, for example in the range from 10,600 m to 11,400 m, for example in the range from 10,700 m (around 35,000 ft) to 11,300 m, for example in the range from 10,800 m to 11,200 m, for example in the range from 10,900 m to 11,100 m, for example of the order of 11,000 m. The cruise conditions may correspond to standard atmospheric conditions at any given altitude in these ranges.

Purely by way of example, the cruise conditions may correspond to the following: a forward Mach number of 0.8; a pressure of 23,000 Pa; and a temperature of −55 degrees C.

As used anywhere herein, "cruising speed" or "cruise conditions" may mean the aerodynamic design point. Such an aerodynamic design point (or ADP) may correspond to the conditions (including, for example, the Mach number, environmental conditions, and thrust requirement) for which the fan operation is designed. This may mean, for example, the conditions under which the fan (or the gas turbine engine) has the optimum efficiency in terms of construction.

In use, a gas turbine engine described and/or claimed herein can operate at the cruise conditions defined elsewhere herein. Such cruise conditions can be determined by the cruise conditions (for example the mid-cruise conditions) of an aircraft to which at least one (for example 2 or 4) gas turbine engine can be fastened in order to provide the thrust force.

It is self-evident to a person skilled in the art that a feature or parameter described in relation to one of the above aspects may be applied to any other aspect, unless these are mutually exclusive. Furthermore, any feature or any parameter described here may be applied to any aspect and/or combined with any other feature or parameter described here, unless these are mutually exclusive.

BRIEF DESCRIPTION OF THE SEVERAL VIEWS OF THE DRAWINGS

The invention will be explained in more detail below on the basis of a plurality of exemplary embodiments with reference to the figures of the drawing. In the drawing.

DETAILED DESCRIPTION OF THE INVENTION

Figure 1:
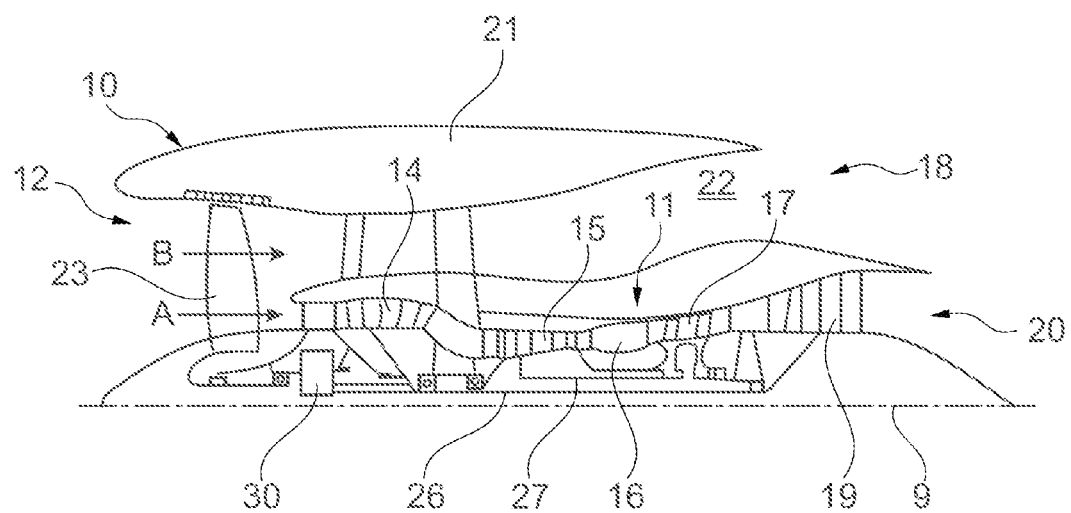
FIG. 1 shows a lateral sectional view of a gas turbine engine.

FIG. 1 illustrates a gas turbine engine 10 having a main axis of rotation 9. The engine 10 comprises an air intake 12 and a thrust fan 23 that generates two air flows: a core air flow A and a bypass air flow B. The gas turbine engine 10 comprises a core 11 which receives the core air flow A. In the sequence of axial flow, the engine core 11 comprises a low-pressure compressor 14, a high-pressure compressor 15, a combustion device 16, a high-pressure turbine 17, a low-pressure turbine 19, and a core thrust nozzle 20. An engine nacelle 21 surrounds the gas turbine engine 10 and defines a bypass duct 22 and a bypass thrust nozzle 18. The bypass air flow B flows through the bypass duct 22. The fan 23 is attached to and driven by the low-pressure turbine 19 by way of a shaft 26 and an epicyclic gear box 30.

During use, the core air flow A is accelerated and compressed by the low-pressure compressor 14 and directed into the high-pressure compressor 15, where further compression takes place. The compressed air expelled from the high-pressure compressor 15 is directed into the combustion device 16, where it is mixed with fuel and the mixture is combusted. The resulting hot combustion products then propagate through the high-pressure and the low-pressure turbines 17, 19 and thereby drive said turbines, before being expelled through the nozzle 20 to provide a certain propulsive thrust. The high-pressure turbine 17 drives the high-pressure compressor 15 by means of a suitable connecting shaft 27. The fan 23 generally provides the major part of the thrust force. The epicyclic gear box 30 is a reduction gear box.

Figure 2:
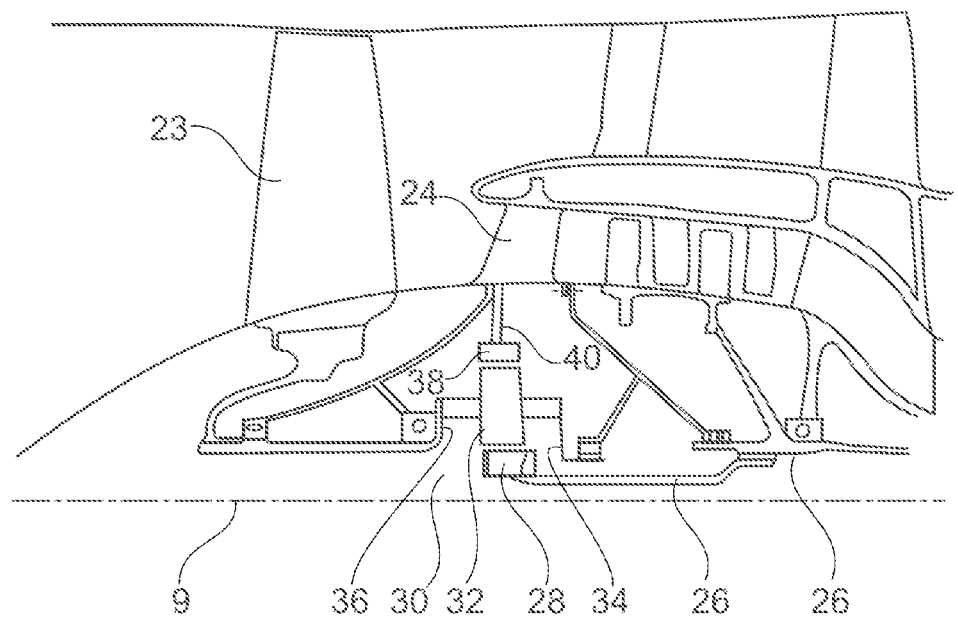
FIG. 2 shows a close-up lateral sectional view of an upstream portion of a gas turbine engine.

An exemplary arrangement for a geared fan gas turbine engine 10 is shown in FIG. 2. The low-pressure turbine 19 (see FIG. 1) drives the shaft 26, which is coupled to a sun gear 28 of the epicyclic gear box assembly 30. Multiple planet gears 32, which are coupled to one another by a planet carrier 34, are situated radially to the outside of the sun gear 28 and mesh therewith. The planet carrier 34 limits the planet gears 32 to orbiting around the sun gear 28 in a synchronous manner while enabling each planet gear 32 to rotate about its own axis. The planet carrier 34 is coupled by way of linkages 36 to the fan 23 so as to drive the rotation of the latter about the engine axis 9. Radially to the outside of the planet gears 32 and meshing therewith is an annulus or ring gear 38 that is coupled, via linkages 40, to a stationary support structure 24.

It is noted that the terms "low-pressure turbine" and "low-pressure compressor" as used herein can be taken to mean the lowest pressure turbine stage and the lowest pressure compressor stage (that is to say not including the fan 23) respectively and/or the turbine and compressor stages that are connected to one another by the connecting shaft 26 with the lowest rotational speed in the engine (that is to say not including the gear box output shaft that drives the fan 23). In some documents, the "low-pressure turbine" and the "low-pressure compressor" referred to herein may alternatively be known as the "intermediate-pressure turbine" and "intermediate-pressure compressor". Where such alternative nomenclature is used, the fan 23 can be referred to as a first compression stage or lowest-pressure compression stage.

Figure 3:
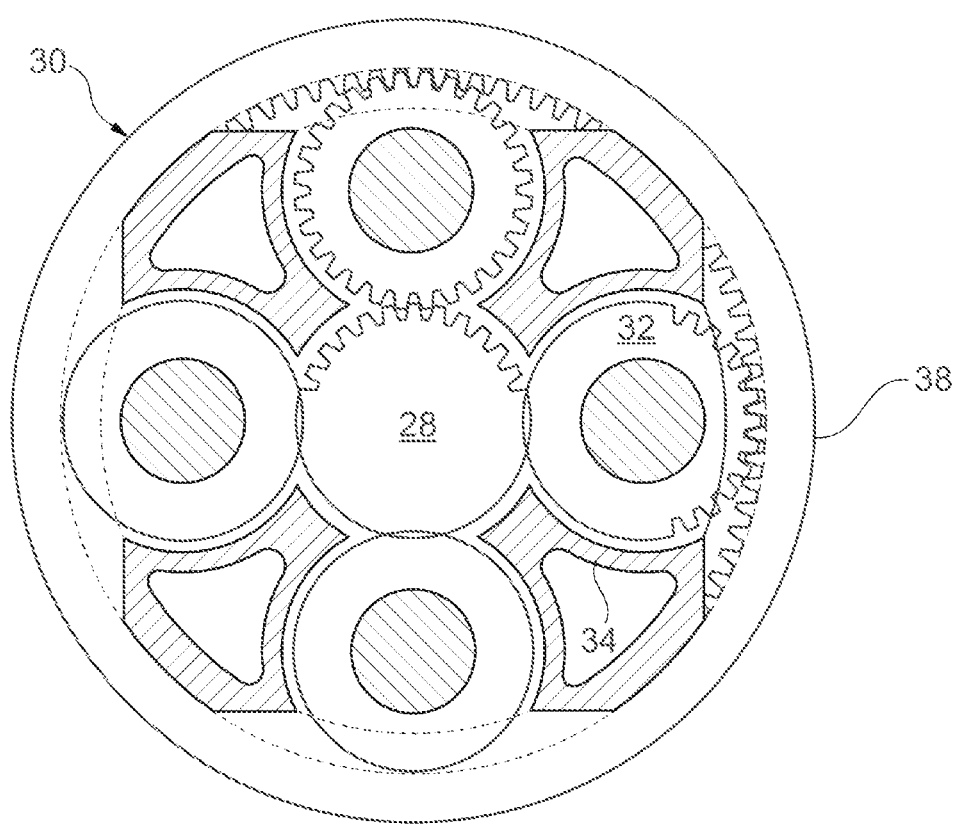
FIG. 3 shows a partially cut-away view of a gear box for a gas turbine engine.

The epicyclic gear box 30 is shown in an exemplary manner in greater detail in FIG. 3. Each of the sun gear 28, the planet gears 32 and the ring gear 38 comprise teeth about their periphery to mesh with the other gears. However, for clarity, only exemplary portions of the teeth are illustrated in FIG. 3. Although four planet gears 32 are illustrated, it will be apparent to the person skilled in the art that more or fewer planet gears 32 may be provided within the scope of protection of the claimed invention. Practical applications of an epicyclic gear box 30 generally comprise at least three planet gears 32.

The epicyclic gear box 30 illustrated by way of example in FIGS. 2 and 3 is a planetary gear box, in that the planet carrier 34 is coupled to an output shaft via linkages 36, wherein the ring gear 38 is fixed. However, any other suitable type of epicyclic gear box 30 can be used. By way of further example, the epicyclic gear box 30 can be a star arrangement, in which the planet carrier 34 is held so as to be fixed, wherein the ring gear (or annulus) 38 is allowed to rotate. In the case of such an arrangement, the fan 23 is driven by the ring gear 38. As a further alternative example, the gear box 30 can be a differential gear box in which both the ring gear 38 and the planet carrier 34 are allowed to rotate.

It will be appreciated that the arrangement shown in FIGS. 2 and 3 is by way of example only, and various alternatives are within the scope of protection of the present disclosure. Purely by way of example, any suitable arrangement can be used for positioning the gear box 30 in the engine 10 and/or for connecting the gear box 30 to the engine 10. By way of a further example, the connections (such as the linkages 36, 40 in the example of FIG. 2) between the gear box 30 and other parts of the engine 10 (such as the input shaft 26, the output shaft and the fixed structure 24) may have a certain degree of stiffness or flexibility. By way of a further example, any suitable arrangement of the bearings between rotating and stationary parts of the engine (for example between the input and output shafts of the gear box and the fixed structures, such as the gear box housing) may be used, and the disclosure is not limited to the exemplary arrangement of FIG. 2. For example, where the gear box 30 has a star arrangement (described above), the person skilled in the art would readily understand that the arrangement of output and support linkages and bearing positions would typically be different to that shown by way of example in FIG. 2.

Accordingly, the present disclosure extends to a gas turbine engine having an arbitrary arrangement of gear box types (for example star-shaped or planetary), support structures, input and output shaft arrangement, and bearing positions.

Optionally, the gear box may drive additional and/or alternative components (e.g. the intermediate-pressure compressor and/or a booster compressor).

Other gas turbine engines in which the present disclosure can be used may have alternative configurations. For example, such engines may have an alternative number of compressors and/or turbines and/or an alternative number of connecting shafts. As a further example, the gas turbine engine shown in FIG. 1 has a split flow nozzle 20, 22, which means that the flow through the bypass duct 22 has a dedicated nozzle, which is separate from the engine core nozzle 20 and is radially on the outside with respect to the latter. However, this is not restrictive, and any aspect of the present disclosure can also apply to engines in which the flow through the bypass duct 22 and the flow through the core 11 are mixed or combined before (or upstream of) a single nozzle, which may be referred to as a mixed flow nozzle. One or both nozzles (whether mixed or split flow) can have a fixed or variable area. Although the example described relates to a turbofan engine, the disclosure can be applied, for example, to any type of gas turbine engine, such as, for example, an open rotor engine (in which the fan stage is not surrounded by an engine nacelle) or a turboprop engine. In some arrangements, the gas turbine engine 10 may not comprise a gear box 30.

The geometry of the gas turbine engine 10, and components thereof, is/are defined by a conventional axis system, comprising an axial direction (which is aligned with the axis of rotation 9), a radial direction (in the bottom-to-top direction in FIG. 1), and a circumferential direction (perpendicular to the view in FIG. 1). The axial, radial and circumferential directions run so as to be mutually perpendicular.

Figure 4:
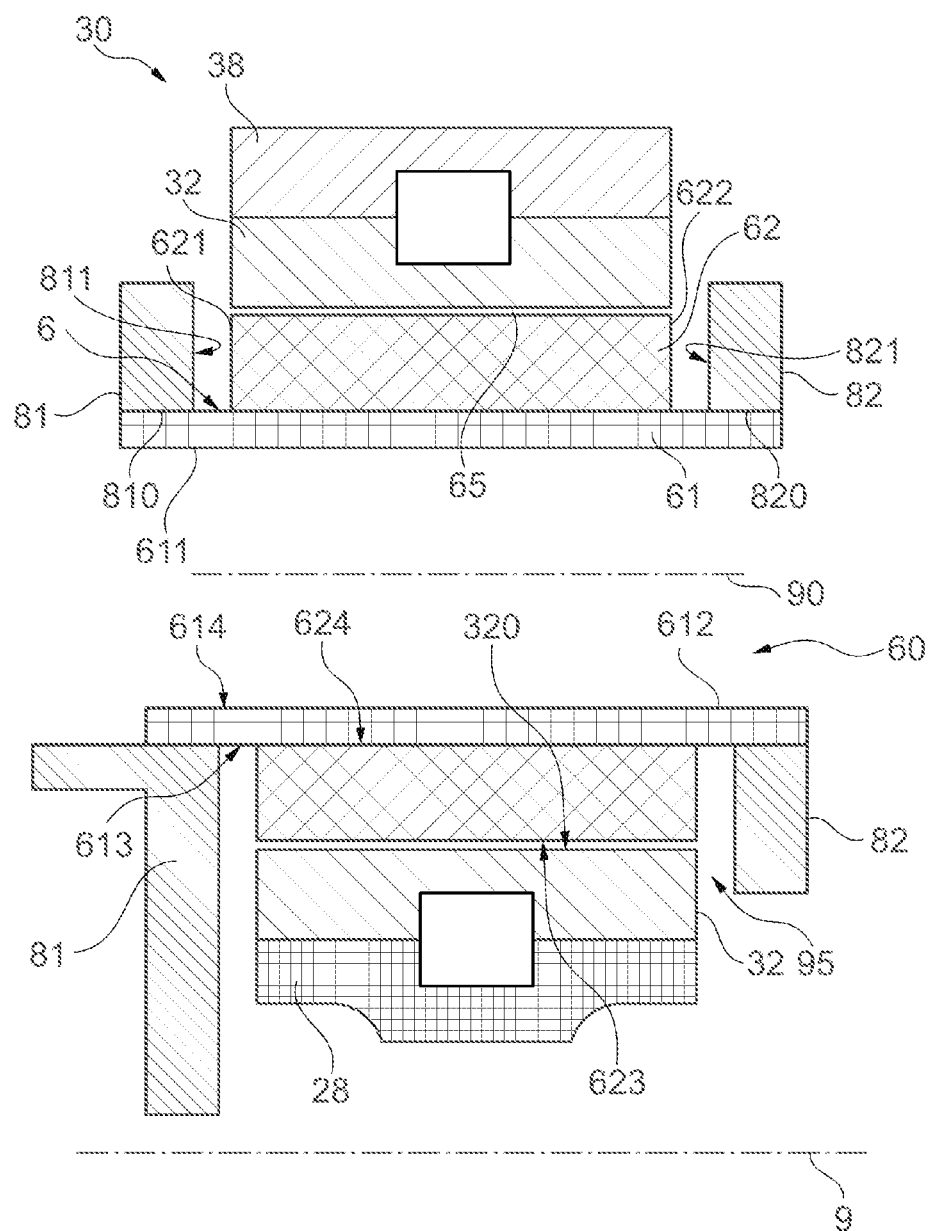
FIG. 4 shows an exemplary embodiment of a planetary gear box which comprises a planet pin having a radially inner pin part and a radially outer pin part.

FIG. 4 shows a sectional illustration of another exemplary embodiment of a planetary gear box of a gas turbine engine 10 as shown in FIG. 1. Attention is drawn here to the fact that the planetary gear box described is used in a gas turbine engine only by way of example. In principle, the planetary gear box can be designed in the manner described below in any context.

The planetary gear box 30 comprises a sun gear 28, which is driven by a drive shaft or sun shaft (not illustrated). The drive shaft is, for example, the shaft 26 in FIGS. 1 and 2 or, more generally, a turbine shaft. In this arrangement, the sun gear and the drive shaft 26 rotate around the axis of rotation 9. The axis of rotation of the planetary gear box 30 is identical with the axis of rotation 9 or engine axis of the gas turbine engine 10.

The planetary gear box 30 furthermore comprises a plurality of planet gears 32, one of which is illustrated in the sectional illustration in FIG. 4. The sun gear 28 drives the plurality of planet gears 32, wherein a toothing of the sun gear 28 is in engagement with a toothing of the planet gear 32.

Driven by the sun gear 28, the planet gear 32 rotates around an axis of rotation 90, which is parallel to the axis of rotation 9.

The outer circumferential surface of the planet gear 32 forms a toothing, which is in engagement with the toothing of a ring gear 38. The ring gear 38 is arranged in a fixed manner, i.e. in such a way that it does not rotate. Owing to their coupling with the sun gear 28, the planet gears 32 rotate and, in so doing, move along the circumference of the ring gear 38. The rotation of the planet gears 32 along the circumference of the ring gear 38 and simultaneously around the axis of rotation 90 is slower than the rotation of the drive shaft 26 (see drive shaft 26 in FIGS. 1 and 2, for example), thereby providing a reduction ratio.

However, attention is drawn to the fact that the present invention is not restricted to planetary gear boxes with a stationary ring gear. It can likewise be implemented in planetary gear boxes with a stationary planet carrier and a rotating ring gear.

Adjoining its inner circumferential surface, the planet gear 32 has a centered inner axial hole or opening 320. A planet pin 6 is introduced into the opening 320. The planet pin 6 is of two-part design and forms a radially inner pin part 61 and a radially outer pin part 62. The radially inner pin part 61 is of internally hollow design and has an outer surface or outer circumferential surface 613 and an inner surface or inner circumferential surface 614. The radially outer pin part 62 is likewise of internally hollow design and has an outer surface or outer circumferential surface 623 and an inner surface or inner circumferential surface 624. It forms an internal hole 60.

In this arrangement, the radially outer pin part 62 and the planet gear 32 form a bearing 65, e.g. a rolling bearing or a plain bearing, at their mutually facing surfaces 623, 320. The radially outer pin part 62 and the radially inner pin part 61 are connected to one another in a manner precluding relative rotation therebetween at their mutually facing surfaces 624, 613.

The radially outer pin part 62 and the radially inner pin part 61 can be composed of the same material. Possible materials are steel or ceramics, for example. In principle, however, it is also possible for the radially inner pin part 61 and the radially outer pin part 62 to be composed of a different material.

FIG. 4 furthermore shows a forward carrier plate 81 and a rearward carrier plate 82, which form a planet carrier (cf. FIG. 2). The radially inner pin part 61, and this alone, is fixed to the forward carrier plate 81 and to the rearward carrier plate 82. For this purpose, both the forward carrier plate 81 and the rearward carrier plate 82 have a fixing opening 810, 820, into which the axial end regions 611, 612 of the radially inner pin part 61 are inserted. In this case, provision can be made for the two fixing openings 810, 820 to have the same or a different diameter. Here, the diameter or the larger of the diameters is dimensioned in such a way that the radially inner pin part 61 can be pushed axially through the fixing opening 810, 820 during the assembly of the planetary gear box 30.

The forward carrier plate 81 is for example connected to a torque transmitting member, which is coupled to a fan shaft.

In the embodiment shown in FIG. 4, the radially outer pin part 62 does not extend as far as the carrier plates 81, 82, and therefore there is in each case a gap 95 between the ends 621, 622 of the radially outer pin part and the inner surfaces 811, 812 of the carrier plates 81, 82.

In respect of the assembly of the planet gears 32 and the planet pins 6, the assembly of the planetary gear box 30 is performed in such a way that, first of all, the radially outer pin part 62 is in each case pushed into the axial opening 320 of the planet gear 32. This takes place before the installation of the radially inner pin part 61. The planet gear 32 and the radially outer pin part 62 are then mounted in a suitable way in the planetary gear box between the two already installed carrier plates 81, 82, wherein the inner surface 624 of the radially outer pin part 62 is in alignment with at least one of the fixing openings 810, 820 of the carrier plates 81, 82. In this case, the planet gear 32 and the radially outer pin part 62 can be pushed into position from the inside or from the outside.

The radially inner pin part 61 is then pushed axially into the radially outer pin part 62, wherein positive engagement elements of the radially inner pin part 61 and of the radially outer pin part 62, which provide positive engagement between the two pin parts 61, 62 in a manner precluding relative rotation thereof, enter into engagement with one another, or frictional engagement or an interference fit is implemented. In this case, the fixing of the ends 611, 612 of the radially inner pin part 61 in the fixing openings 810, 820 of the carrier plates 81, 82 is performed in a manner known per se, e.g. by implementing a strong interference fit. In this case, retaining bushes, wedging elements or the like, which are pressed into the fixing openings 810, 820, can be used.

Attention is drawn to the fact that the two carrier plates 81, 82 can be manufactured in one piece, thereby ensuring that they are connected to one another in a fixed manner and do not have to be joined together before the installation of the planet gear. However, this is not necessarily the case.

Attention is furthermore drawn to the fact that the assembly method described is to be understood purely by way of example. Alternatively, it is possible, for example, to conceive of assembly sequences in which the axially forward carrier plate 81 and/or the axially rearward carrier plate 82 are installed only after the positioning of the radially outer pin part 62 and of the planet gear 32.

The fixing openings 810, 820 require a diameter which is only such that the radially inner pin part 61 can be pushed through the fixing openings from one side. The outside diameter of the outer surface 623 of the radially outer pin part 62 can accordingly be significantly larger than the diameter of the fixing openings 810, 820, creating additional design options.

FIGS. 5-16 show variant embodiments of the arrangement of the radially inner pin part 61, the radially outer pin part 62 and the carrier plates 81, 82 in a planetary gear box according to FIG. 4.

Figure 5:
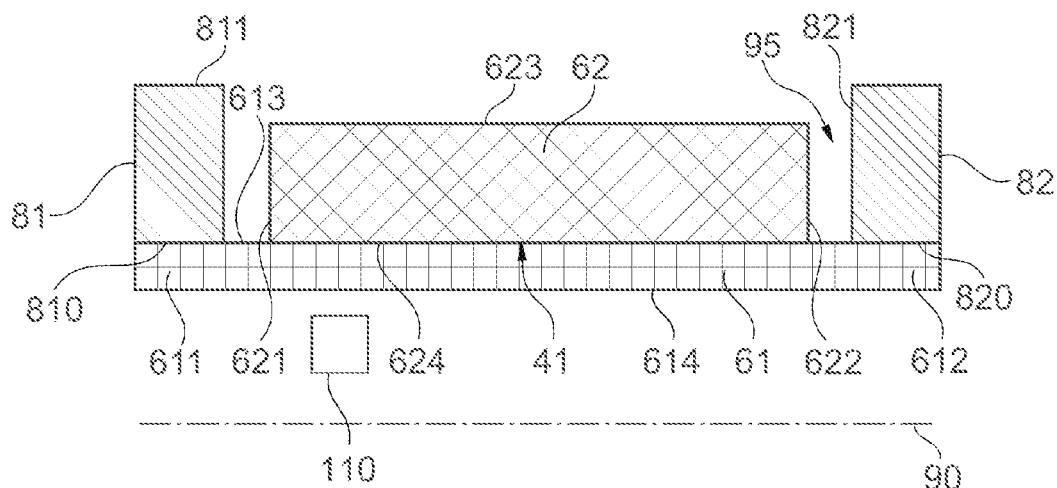
FIG. 5 shows a variant embodiment of a planet pin having a radially inner pin part and a radially outer pin part, wherein the radially outer pin part ends at an axial distance from the carrier plates of the planetary gear box.

The arrangement according to FIG. 5 corresponds substantially to the arrangement according to FIG. 4, and therefore attention is drawn to the description of FIG. 4. Positive engagement, frictional engagement or material engagement 41 are envisaged, providing a connection precluding relative rotation between the radially inner pin part 61 and the radially outer pin part 62. In FIG. 5 and also in the other figures, the positive, frictional or nonpositive connection 41 is not illustrated specifically in terms of its structural details since these would in any case be purely by way of example.

In the case of a positive connection precluding relative rotation between the radially inner pin part 61 and the radially outer pin part 62, for example, provision can be made for the positive connection 41 to be provided by a splined joint.

In this context, one embodiment envisages that the connection 41 is designed in such a way that positive engagement, frictional engagement or material engagement is released when the relative torque acting between the radially inner pin part 61 and the radially outer pin part 62 exceeds a predetermined value. For example, a positive engagement element is provided with a predetermined breaking point which breaks when the predefined value of the torque is exceeded, or the frictional engagement is designed in such a way that it permits a relative movement above a certain torque. This provides a protection mechanism which allows rotation of the radially outer pin part 62 relative to the radially inner pin part 61 if there is a fault in the bearing.

It is furthermore possible in this context to envisage the provision of detection means 110, schematically illustrated in FIG. 5, which detect a relative movement between the radially outer pin part 62 and the radially inner pin part 61 and thereby detect damage. The detection means 110 are, for example, a pressure sensor which is integrated into the oil system of the planetary gear box or gas turbine engine and which detects a deviation in the oil pressure from a setpoint pressure.

In FIG. 5, the outer surface 613 of the radially inner pin part 61 and the inner surface 624 of the radially outer pin part 62 form an outer and inner cylinder surface, thus ensuring that there is a connection precluding relative rotation over the entire length of the radially outer pin part 62. If there is an interference fit between the radially inner pin part 61 and the radially outer pin part 62, the inside diameter of the radially outer pin part 62 is slightly smaller than the outside diameter of the radially inner pin part 61. If the connection is established by positive engagement, the outer circumferential surface of the radially inner pin part 61 can have design features such as toothing, for example.

The size of the fixing openings 810, 820 is dimensioned in such a way that the inner pin part 61 can be introduced and fitted. In this case, the outside diameter of the radially inner pin part 61 must fit through the fixing openings. If the outside diameters of the inner pin part 61 differ at the two ends (see FIGS. 11-16), the larger outside diameter (including any design features that are present) must fit through at least one of the fixing openings 810, 820.

Figure 17:
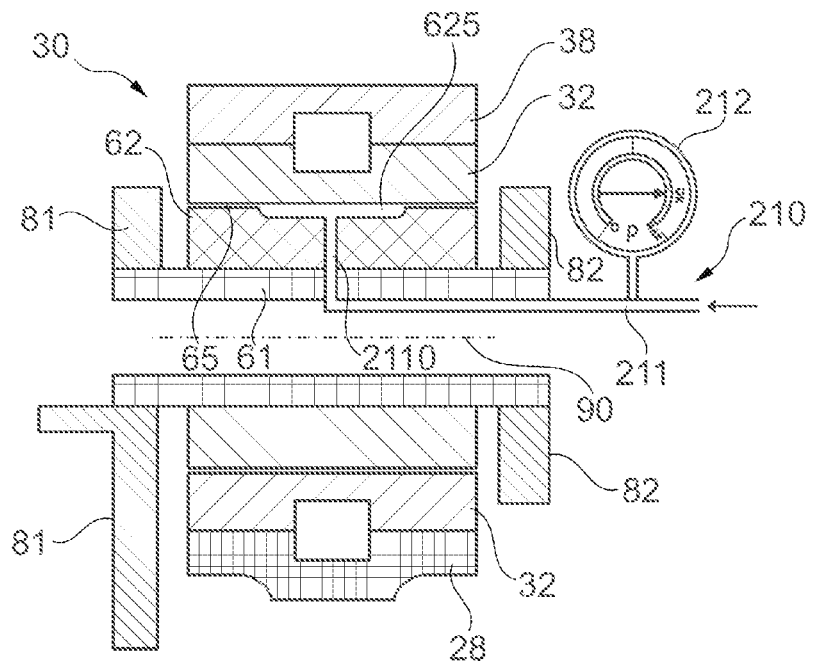
FIG. 17 shows a variant embodiment of a planetary gear box with a planet pin having a radially inner pin part and a radially outer pin part, wherein the bearing between the planet pin and the planet gear is supplied with oil via an oil line, and the pressure in the oil line is measured.
Figure 18:
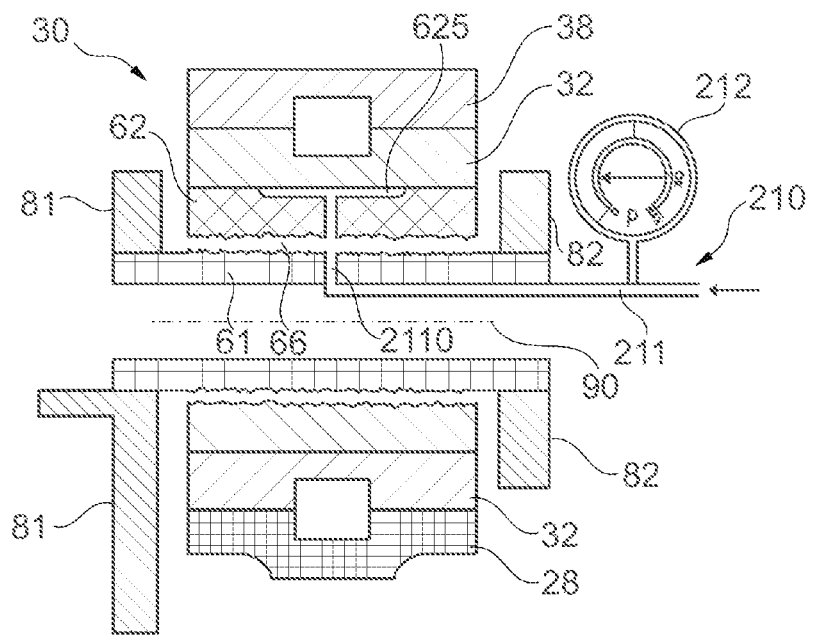
FIG. 18 shows the exemplary embodiment of FIG. 17 after the connection precluding relative rotation between the radially inner pin part and the radially outer pin part has been released, wherein the pressure in the oil line has dropped.

FIGS. 17 and 18 show an exemplary embodiment of the case discussed with reference to FIG. 5, where the connection precluding relative rotation between the radially inner pin part 61 and the radially outer pin part 62 is released since the torque acting between the radially inner pin part 61 and the radially outer pin part 62 has exceeded a predetermined value, and such a release of the connection precluding relative rotation is detected.

Here, FIG. 17 shows an exemplary embodiment of a planetary gear box 30 corresponding to FIG. 4, and therefore attention is drawn to the description of FIG. 4. In addition to the components illustrated in FIG. 4, an oil supply 210 is schematically illustrated, said oil supply comprising an oil line 211, via which oil is supplied to the bearing 65 between the radially outer pin part 62 and the planet gear 32. The oil supplied is under pressure P, which is measured by means of a pressure gauge 212.

In this case, the oil line 211 comprises a line segment 2110 which extends from the radially inner pin part 61 to the radially outer pin part 62 and thus across the interface or connection precluding relative rotation between the two pin parts 61, 62. The oil line 2110 ends in a recess 625 in the radially outer pin part 62, from where the oil is distributed through the entire bearing 65. Such recesses 65 can also be provided in the other exemplary embodiments described.

FIG. 18 shows the state in which the connection precluding relative rotation between the radially inner pin part 61 and the radially outer pin part 62 has been released. This fault is associated with breakup of the bearing between the radially outer pin part 62 and the planet gear 32. The two components 62, 32 are wedged together, and relative movement no longer occurs. The torque thereby released leads to breakup of the connection precluding relative rotation between the radially outer pin part 62 and the radially inner pin part 61.

In such a case, the line segment 2110 in the region of the interface between the radially inner pin part 61 and the radially outer pin part 62 is also divided into two parts. Thus, oil can penetrate from the oil line 211 or from the stub of line segment 2110 which remains in the radially inner pin part 61 into the gap 66 which is now formed between the radially inner pin part 61 and the radially outer pin part 62. Accordingly, a pressure drop is measured across the pressure gauge 212. Measurement of the pressure drop allows detection of the fault.

Attention is drawn to the fact that the illustrated fault of wedging between the radially outer pin part 62 and the planet gear 32 is purely illustrative. In the case of other faults too, in which the connection precluding relative rotation between the radially inner pin part 61 and the radially outer pin part 62 is released, it is possible to detect a fault by way of a change in pressure.

Figure 6:
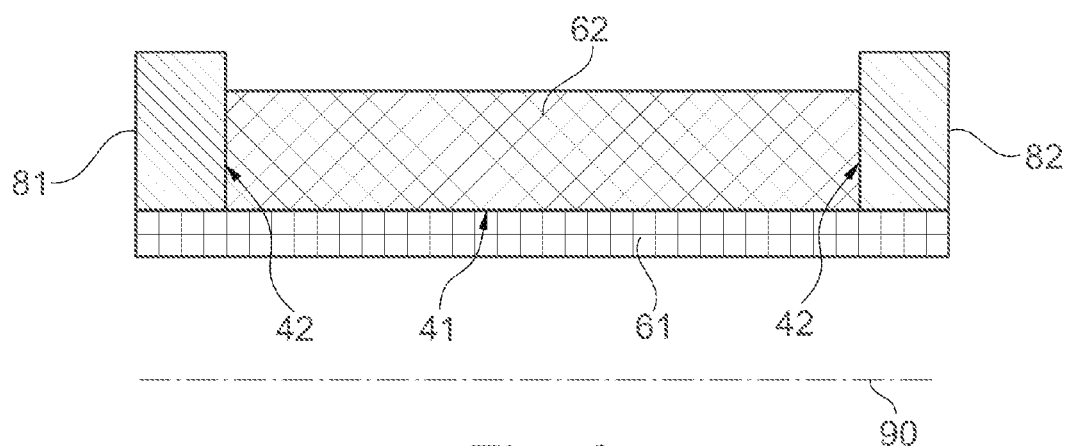
FIG. 6 shows a variant embodiment of a planet pin having a radially inner pin part and a radially outer pin part, wherein the radially outer pin part extends as far as the carrier plates of the planetary gear box.

FIG. 6 shows an exemplary embodiment in which the axial ends 621, 622 (FIG. 5) of the radially outer pin part 62 extend as far as the respective carrier plate 81, 82. In this case, it is envisaged that the axial ends are connected to the respective carrier plate 81, 82 in a manner precluding relative rotation by positive engagement means 42, thus ensuring that relative rotation between the carrier plates 81, 82 and the radially outer pin part 62 is reliably prevented. To this extent, the positive engagement means 42 supplement the already existing indirect connection precluding relative rotation between the radially outer pin part 62 and the carrier plates 81, 82, which is provided by way of the connection precluding relative rotation between the radially outer pin part 62 and the radially inner pin part 61, on the one hand, and between the radially inner pin part 61 and the carrier plates 81, 82, on the other hand.

Using the additional positive engagement means 42, it is possible to exactly position the ends 621, 622 of the radially outer pin part in respect of their radial position as well.

The structural details of the positive engagement means 42 are not illustrated specifically in FIG. 6. Illustrative embodiments using pins or ribs on the end faces of the radially outer pin part 62, which engage in recesses, grooves or slots in the carrier plate 81, 82 or vice versa. It is also possible, for example, to envisage that respective fixing pins are introduced at the ends into the respective end face of the radially outer pin part 62 from the outside of the carrier plate 81, 82. Such an embodiment is associated with the advantage that the positive engagement elements 42 do not have to be already present when the radially outer pin part 62 together with the planet gear 32 is being positioned between the carrier plates 81, 82.

Figure 7:
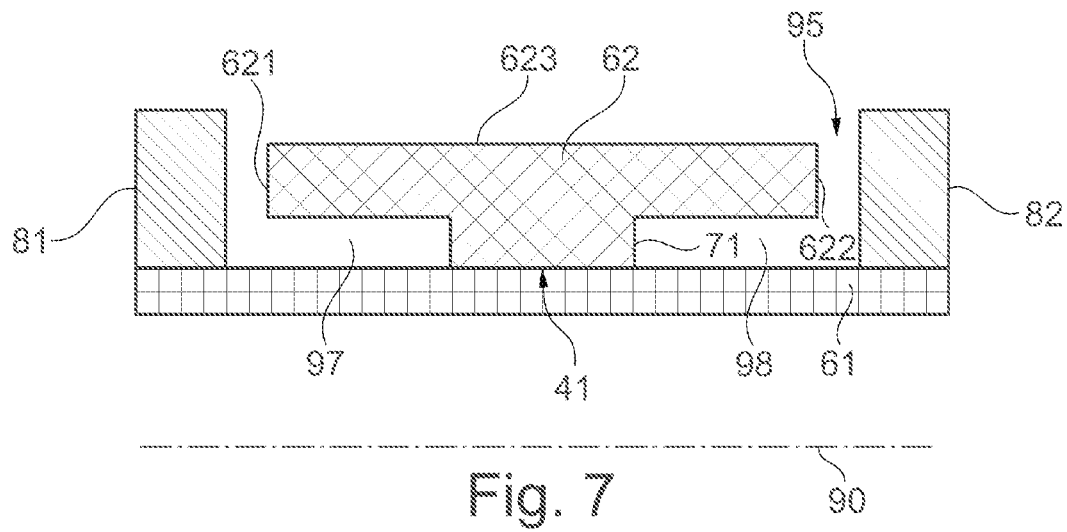
FIG. 7 shows a variant embodiment of a planet pin having a radially inner pin part and a radially outer pin part, wherein the radially inner pin part and the radially outer pin part are connected via a web of the radially outer pin part, and wherein the radially outer pin part ends at an axial distance from the carrier plates of the planetary gear box.

FIG. 7 shows a variant embodiment in which the radially inner pin part 61 and the radially outer pin part 62 do not adjoin one another over their entire length but are connected to one another via a radially extending web 71. In the exemplary embodiment in FIG. 7, the web 71 is arranged centrally, although this is not necessarily the case. It is formed integrally with the radially outer pin part 62. Here, positive engagement, frictional engagement or material engagement 41 for connection precluding relative rotation between the two pin parts 61, 62 is formed between the radially inner pin part 61 and the web 71.

Owing to the connection between the radially inner pin part 61 and to the radially outer pin part 62 only via a web 72, recesses 97, 98 are formed which extend from the radially outer ends 621, 622 in the direction of the web 71 between the radially outer pin part 62 and the radially inner pin part 61. As a result, the rigidity in the axial direction of the radially outer pin part 62 is varied and, in particular, is modified in the region of its ends 621, 622. This can be used, in the alternative, to minimize the bearing gap between the outer surface 623 of the radially outer pin part 62 and the axial opening 320 of the planet gear 32 (see FIG. 4) and to make it as uniform as possible.

Attention is drawn to the fact that the web 71 can extend through 360° in the circumferential direction. Alternatively, provision can be made for the web 71 to consist of segments, each extending over a certain circumferential region, which are arranged spaced apart in the circumferential direction. This also applies to the other exemplary embodiments in which one or more webs are provided.

Figure 8:
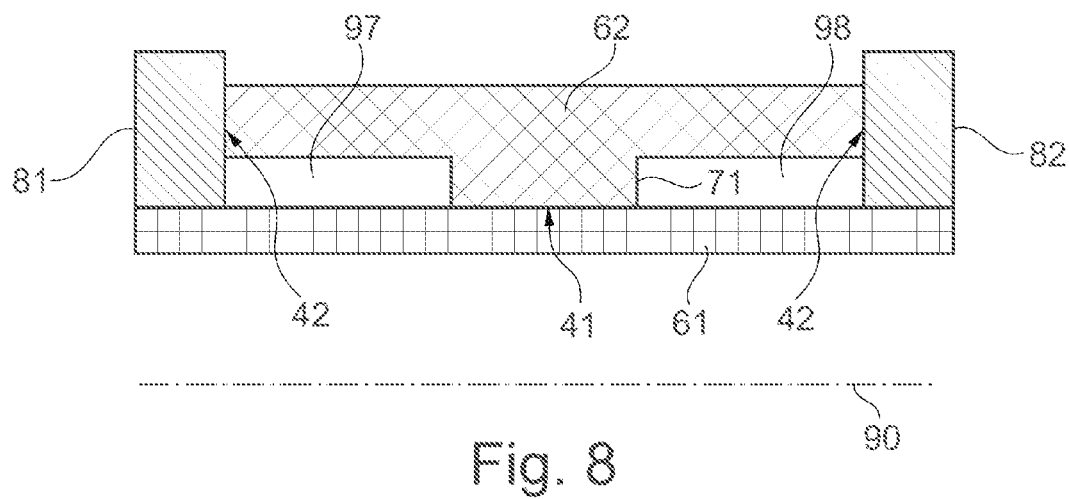
FIG. 8 shows a variant embodiment of a planet pin having a radially inner pin part and a radially outer pin part, wherein the radially inner pin part and the radially outer pin part are connected via a web of the radially outer pin part, and wherein the radially outer pin part extends as far as the carrier plates of the planetary gear box.

The initial example in FIG. 8 corresponds in terms of basic construction to the exemplary embodiment in FIG. 7, wherein additionally, as per FIG. 6, the axial ends 621, 622 of the radially outer pin part 62 extend as far as the respective carrier plate 81, 82 and are fixed to the latter in a manner precluding relative rotation by positive engagement means 42.

Figure 9:
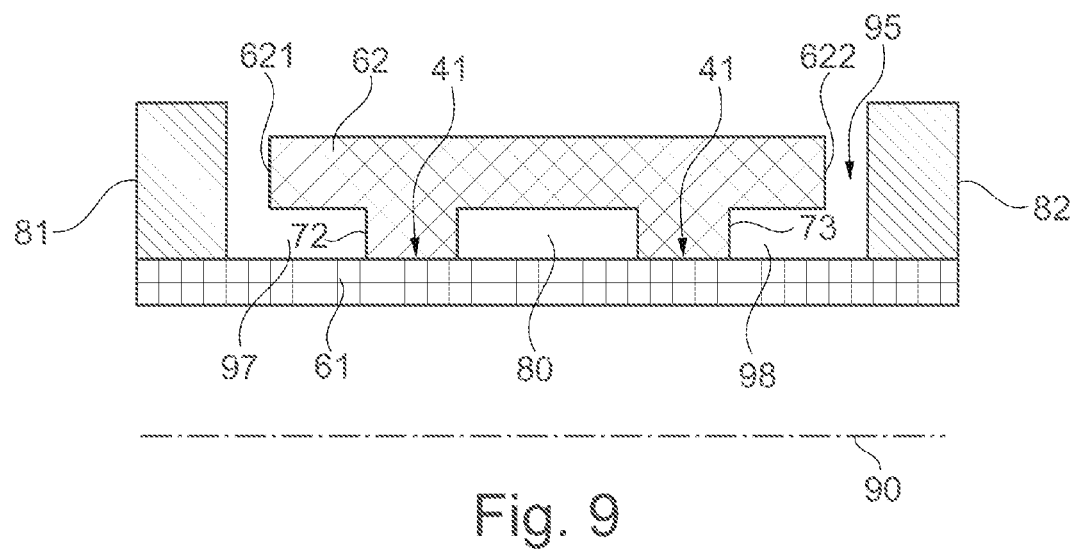
FIG. 9 shows a variant embodiment of a planet pin having a radially inner pin part and a radially outer pin part, wherein the radially inner pin part and the radially outer pin part are connected via two webs of the radially outer pin part, and wherein the radially outer pin part ends at an axial distance from the carrier plates of the planetary gear box.

FIG. 9 shows an exemplary embodiment in which the radially inner pin part 61 and the radially outer pin part 62 are connected to one another by two webs 72, 73, wherein the two webs 72, 73 are offset axially relative to one another, thus giving rise to a cavity 80 between them as well as between the radially inner pin part 61 and the radially outer pin part 62.

In the exemplary embodiment illustrated, the two webs 72, 73 are arranged symmetrically with respect to the axial center between the two carrier plates 81, 82, although this is not necessarily the case. Owing to the webs 72, 73, as in the exemplary embodiment in FIGS. 7 and 8, recesses 97, 98 are formed which, starting from the radially outer ends 621, 622, extend in the direction of the respective web 72, 73 between the radially outer pin part 62 and the radially inner pin part 61. By a suitable positioning and width of the webs 72, 73, the rigidity of the radially outer pin part 62 can be set in the desired manner in the axial direction in order to optimize the properties of the bearing 65 between the radially outer pin part 62 and the planet gear 32 (see FIG. 4).

The cavity 80 can be used to hold oil that serves for the lubrication of the bearing 65 in FIG. 4. In this case, oil feedthroughs (not illustrated) are formed in the radially inner pin part 61, on the one hand, and in the radially outer pin part 62, on the other hand. In this case, the oil is transported to the cavity 80 via the internal hole 60 in FIG. 4 by means of an oil feed device. Oil filters can furthermore be integrated into the cavity 80, for example. The oil arranged in the cavity 80 furthermore serves to cool the radially outer pin part 62.

Figure 10:
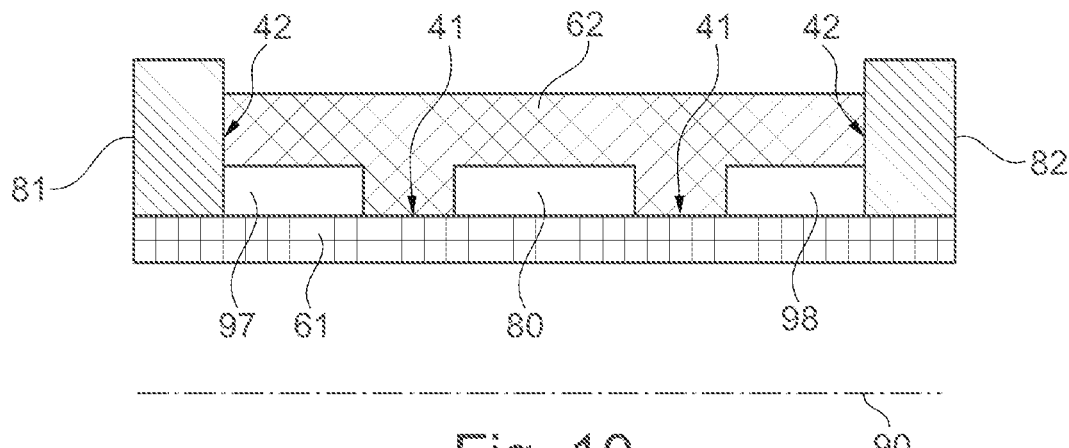
FIG. 10 shows a variant embodiment of a planet pin having a radially inner pin part and a radially outer pin part, wherein the radially inner pin part and the radially outer pin part are connected via two webs of the radially outer pin part, and wherein the radially outer pin part extends as far as the carrier plates of the planetary gear box.

The exemplary embodiment in FIG. 10 corresponds in terms of basic construction to the exemplary embodiment in FIG. 9, wherein additionally, as per FIG. 6 and FIG. 8, the axial ends 621, 622 of the radially outer pin part 62 extend as far as the respective carrier plate 81, 82 and are fixed to the latter in a manner precluding relative rotation by positive engagement means 42. Attention is drawn here to the fact that connection of the axial ends 621, 622 of the radially outer pin part to the respective carrier plate 81, 82 in a manner precluding relative rotation also affects the rigidity of the radially outer pin part 62.

Figure 11:
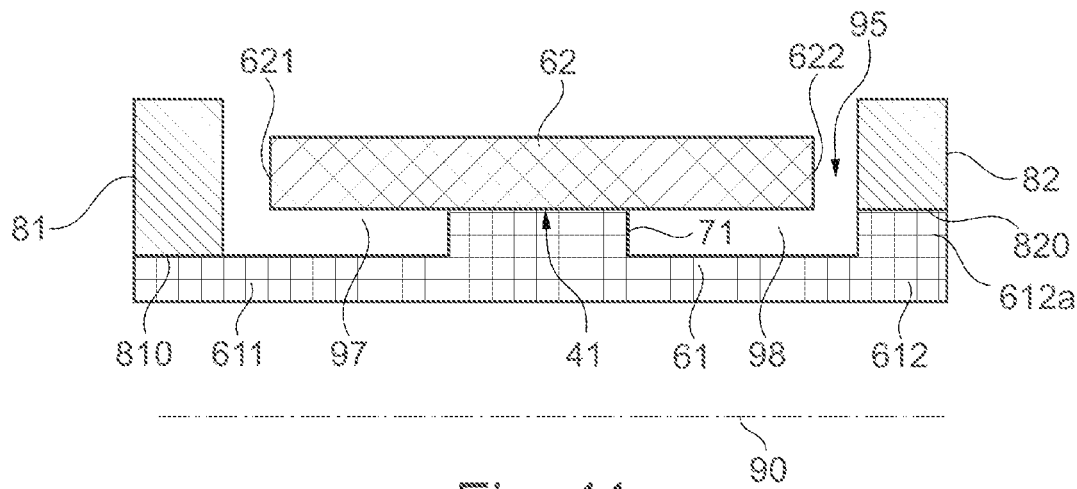
FIG. 11 shows a variant embodiment of a planet pin having a radially inner pin part and a radially outer pin part, wherein the radially inner pin part and the radially outer pin part are connected via a web of the radially inner pin part, and wherein the radially outer pin part ends at an axial distance from the carrier plates of the planetary gear box.

FIG. 11 shows an exemplary embodiment which corresponds in terms of basic construction to the exemplary embodiment in FIG. 7. Here, however, it is envisaged that the web 71 is formed integrally with the radially inner pin part 61. Accordingly, the fixing opening 820 in the one carrier plate 82 has a larger diameter than the fixing opening 810 in the other carrier plate 81, thus enabling the radially inner pin part 61, the radius of which is enlarged by the height of the web 71, to be pushed through the opening 820 in the axial direction during assembly. In the region of the enlarged fixing opening 820, the axial end 612 of the radially inner pin part 61 forms an end-face section 612a of correspondingly enlarged diameter.

Figure 12:
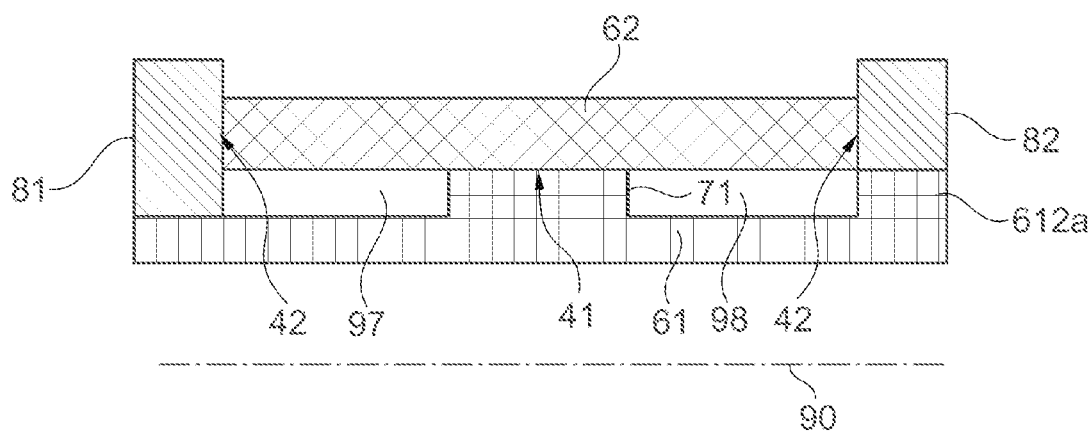
FIG. 12 shows a variant embodiment of a planet pin having a radially inner pin part and a radially outer pin part, wherein the radially inner pin part and the radially outer pin part are connected via a web of the radially inner pin part, and wherein the radially outer pin part extends as far as the carrier plates of the planetary gear box.

FIG. 12 shows an exemplary embodiment which corresponds in terms of basic construction to the exemplary embodiment in FIG. 8, although it is envisaged that the web 71 is formed integrally with the radially inner pin part 61. As is also the case in the exemplary embodiment in FIG. 11, the fixing opening 820 in the carrier plate 82 is accordingly enlarged, and the radially inner pin part 61 forms an end-face section 612a of enlarged diameter.

Figure 13:
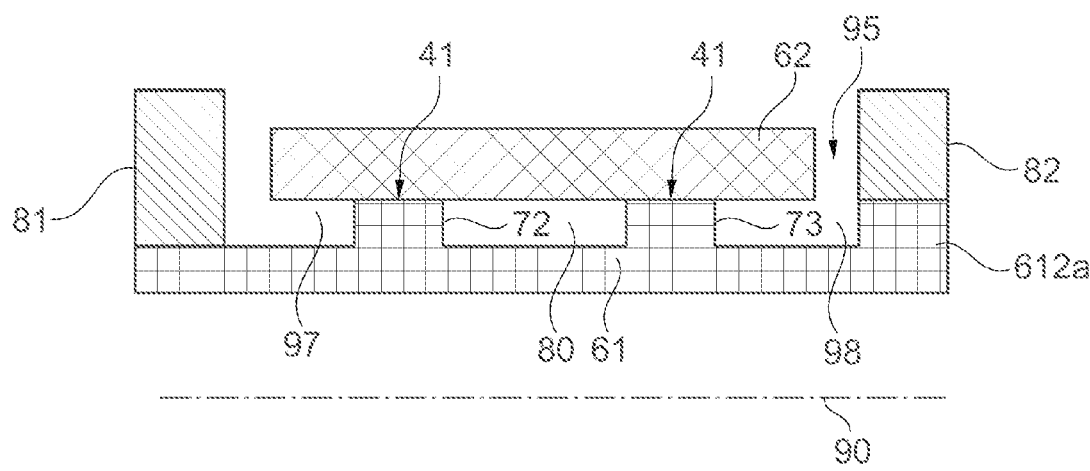
FIG. 13 shows a variant embodiment of a planet pin having a radially inner pin part and a radially outer pin part, wherein the radially inner pin part and the radially outer pin part are connected via two webs of the radially inner pin part, and wherein the radially outer pin part ends at an axial distance from the carrier plates of the planetary gear box.

FIG. 13 shows an exemplary embodiment which corresponds in terms of basic construction to the exemplary embodiment in FIG. 9, although it is envisaged that the webs 72, 73 are formed integrally with the radially inner pin part 61. Once again, the fixing opening 820 in the carrier plate 82 is accordingly enlarged, and the radially inner pin part 61 forms an end-face section 612a of enlarged diameter.

Figure 14:
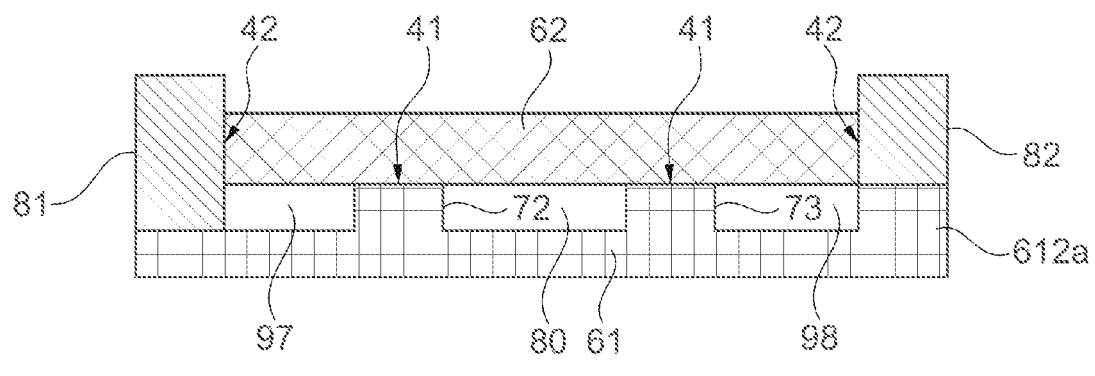
FIG. 14 shows a variant embodiment of a planet pin having a radially inner pin part and a radially outer pin part, wherein the radially inner pin part and the radially outer pin part are connected via two webs of the radially inner pin part, and wherein the radially outer pin part extends as far as the carrier plates of the planetary gear box.

FIG. 14 shows an exemplary embodiment which corresponds in terms of basic construction to the exemplary embodiment in FIG. 10, although it is envisaged that the webs 72, 73 are formed integrally with the radially inner pin part 61. Here too, the fixing opening 820 in the carrier plate 82 is accordingly enlarged, and the radially inner pin part 61 forms an end-face section 612a of enlarged diameter.

Figure 15:
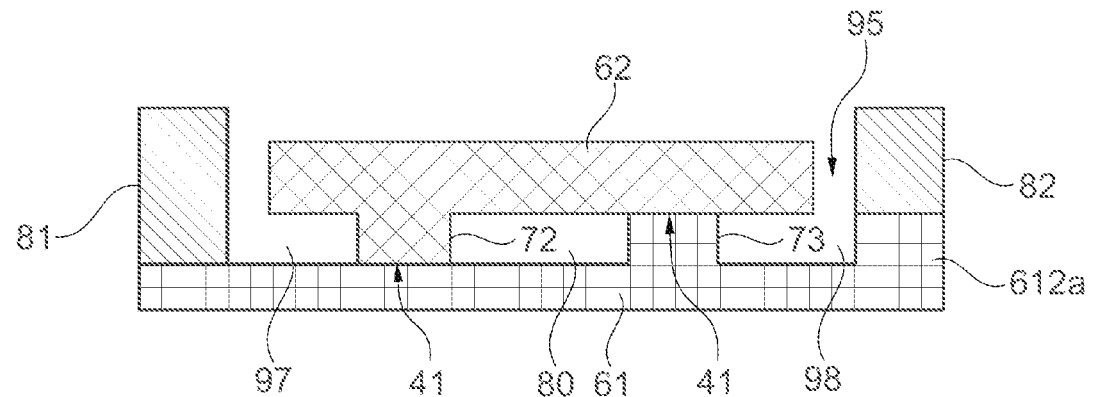
FIG. 15 shows a variant embodiment of a planet pin having a radially inner pin part and a radially outer pin part, wherein the radially inner pin part and the radially outer pin part are connected via two webs, of which one is formed on the radially inner pin part and the other is formed on the radially outer pin part, wherein the radially outer pin part ends at an axial distance from the carrier plates of the planetary gear box.

FIG. 15 shows an exemplary embodiment which corresponds in terms of basic construction to the exemplary embodiment in FIG. 13, although one web 72 is formed integrally with the radially outer pin part 62, and the other web 73 is formed integrally with the radially inner pin part 61. Here too, since one web 73 is formed integrally with the radially inner pin part 61, the fixing opening 820 in the carrier plate 82 is enlarged, and the radially inner pin part 61 forms an end-face section 612a of enlarged diameter.

Figure 16:
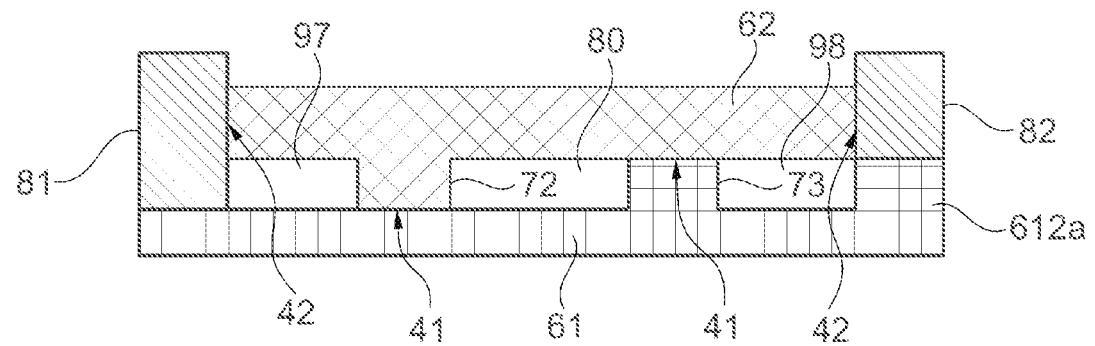
FIG. 16 shows a variant embodiment of a planet pin having a radially inner pin part and a radially outer pin part, wherein the radially inner pin part and the radially outer pin part are connected via two webs of the radially outer pin part, of which one is formed on the radially inner pin part and the other is formed on the radially outer pin part, and wherein the radially outer pin part extends as far as the carrier plates of the planetary gear box.

FIG. 16 shows an exemplary embodiment which corresponds in terms of basic construction to the exemplary embodiment in FIG. 14, although one web 72 is formed integrally with the radially outer pin part 62, and the other web 73 is formed integrally with the radially inner pin part 61. Here too, since one web 73 is formed integrally with the radially inner pin part 61, the fixing opening 820 in the carrier plate 82 is enlarged, and the radially inner pin part 61 forms an end-face section 612a of enlarged diameter.

Finally, the embodiments described will be systematized once again and identified with the respectively associated advantages according to the following table.

TABLE 1

|  |  | Embodiment | | | | | |
| --- | --- | --- | --- | --- | --- | --- | --- |
|  |  | A | B | C | D | E | F |
| Advantage | 1 | x | x | x | x | x | x |
|  | 2 | x | x | x | x | x | x |
|  | 3 | x | x | x | x | x | x |
|  | 4 | — | x | x | x | x | x |
|  | 5 | (x) | x | x | x | x | x |
|  | 6 | (x) | x | x | x | x | x |
|  | 7 | — | — | — | x | x | x |
|  | 8 | x | x | x | x | x | x |
|  | 9 | x | x | (x) | x | (x) | (x) |

Here, the main embodiments are:
(A) No web, very largely cylindrical geometries, the outer pin part is connected to the inner pin part over its entire length, as shown in FIGS. 4-6;
(B) One web, which is formed integrally with the inner pin part, the outer pin part having a very largely cylindrical geometry, as shown in FIGS. 11 and 12;
(C) One web, which is connected integrally to the outer pin part, the inner pin part having a very largely cylindrical geometry, as shown in FIGS. 7 and 8;
(D) A plurality of webs, which are formed integrally with the inner pin part, the outer pin part having a very largely cylindrical geometry, as shown in FIGS. 13 and 14;
(E) A plurality of webs, which are connected integrally to the outer pin part, the inner pin part having a very largely cylindrical geometry, as shown in FIGS. 9 and 10;

(F) Two webs, each web being connected integrally to one pin part, as shown in FIGS. 15 and 16.

As shown in the above Table 1, these embodiments are associated with advantages 1-9 mentioned below:

Advantage 1: Assembly

A relatively large bearing diameter can be fitted in a planetary gear box having a relatively small fixing opening in the planet carrier. There is an advantage for a planet carrier in which the forward carrier plate is fixedly connected to the rearward carrier plate, i.e. is manufactured in one piece, and which has only small planet pin fixing openings owing to rigidity requirements. A larger bearing diameter may be required in order to increase the load bearing capacity of the bearing.

Advantage 2: High Degree of Freedom in the Design of the Planet Pin

The two-part embodiment of the planet pin makes it possible to satisfy the requirement for a high power density of the planet gear bearing without having a disadvantageous effect on other components of the planetary gear box. The high degree of freedom in the design here results from the possibility of designing the outer pin part and the planet carrier as very largely decoupled from one another.

Advantage 3: High Planet Carrier Rigidity/Potential for Weight Savings

Smaller planet pin fixing openings in the planet carrier increase the rigidity of the planet carrier, as a result of which it is twisted/deformed less severely under load, for example, this in turn improving general bearing functionality and performance. A planet carrier which is more rigid overall furthermore opens up the possibility of weight reduction, which benefits the engine overall.

Advantage 4: Optimized Axial Rigidity of the Planet Pin

The resulting bearing load on the outer pin part in the circumferential and axial directions may be nonuniform, as a result of which it may be deformed in different ways. This deformation can have a disadvantageous effect on general bearing functionality and performance. By means of a specialized configuration of the connection between the inner and outer pin parts, it is possible to optimize the axial rigidity distribution of the outer pin part (embodied as a plain bearing ring, for example) in order to compensate for disadvantageous deformations and thus improve general bearing functionality and performance. The connection can be implemented by means of one or more webs, for example, and these can differ in dimensions and axial position. By means of this variant, it is possible for example to improve the deflection curve and reduce the risk of edge loading (in the plain bearing). Another variant of the connection between the inner and outer pin parts can form a type of spherical plain bearing, for example, which can better compensate for skewed positioning of the bearings.

Advantage 5: Protection Mechanism in the Event of a Fault

The two-part configuration of the planet pin allows functional integration of a protection mechanism. In this case, a parallel key, some other form of positive engagement or frictional engagement can be designed in such a way that rotation of the two bearing pin parts relative to one another is made possible if a fault in the plain bearing leads to an increased relative torque. The predetermined breaking point introduced can considerably reduce the risk of consequential damage in the planetary gear box and a potential breakout of high-energy parts from the engine.

Advantage 6: Fault Detection

As an extension to advantage 5, the relative movement which occurs between the radially inner pin part and the radially outer pin part in the event of a fault can be used to detect this fault or damage in an engine. This can be accomplished, for example, by detection means which are integrated into a fully or intermittently opening oil circuit in the plain bearing oil feed. The damage can lead in the engine oil system to a pressure drop or to pressure fluctuations, which can in turn be used to detect faults and to shut down the engine safely.

Advantage 7: Simpler Integration of Components Relevant to the Oil System

The connection between the inner and the outer pin part can be embodied in such a way that a partially circumferential cavity or annular channel is formed between the two pin parts. This cavity or recess can be part of the oil system, for example, and can be used to supply the bearing. Such a specialized configuration of the cavities and oil routing makes it possible inter alia to cool the planet pin from the inside. It is furthermore possible to insert additional components relevant to the oil system, e.g. filters, screens, seals and/or restrictors, into such cavities, thereby making it possible to improve the quality of the oil introduced into the bearing (e.g. by filtration of contaminants that could cause damage to the bearing) and/or to adjust the feed quantity or pressure correctly. Here too, the two-part planet pin allows simpler integration of these components during assembly.

Advantage 8: Pairing of Various Materials to Improve Functionality

There may be various requirements on the inner and outer pin parts, e.g. different requirements in terms of strength or rigidity levels. To meet these requirements, it may be expedient to manufacture both planet pin parts from various materials or to use various material treatment processes.

Advantage 9: Reduction of Costs During Maintenance

The planet pins integrated into planetary gear boxes can assume complex geometries which, under certain circumstances, result in high manufacturing costs. Since bearings wear during operation, the maintenance/repair costs can be lowered by designing the outer pin part as a primary wearing component with a sufficiently simple geometry. During maintenance, it is thus only necessary to exchange the outer pin part.

It will be understood that the invention is not limited to the embodiments described above, and various modifications and improvements can be made without departing from the concepts described herein. For example, the shape of the webs 71, 72, 73 can differ from a shape which is rectangular in cross section, and they can have curved side faces, for example. It is also possible for more than two webs to be provided, for example.

It is pointed out that any of the features described may be used separately or in combination with any other features, unless they are mutually exclusive. The disclosure extends to and comprises all combinations and sub-combinations of one or a plurality of features which are described here. If ranges are defined, said ranges thus comprise all of the values within said ranges as well as all of the partial ranges that lie in a range.

The invention claimed is:

1. A planetary gear box, comprising:
   a sun gear, which rotates about an axis of rotation of the planetary gear box and is driven by a sun shaft, wherein the axis of rotation defines an axial direction of the planetary gear box,
   a plurality of planet gears, which are driven by the sun gear,
   a ring gear in engagement with the plurality of planet gears, a plurality of planet pins, each arranged in one of the planet gears, respectively, with each planet pin and planet gear arrangement forming a bearing, and an axially forward carrier plate and an axially rearward carrier plate, wherein each of the planet pins is fixed at an axially forward end thereof on the axially forward carrier plate and at an axially rearward end thereof on the axially rearward carrier plate, wherein each of the planet pin is of two-part configuration, having a radially outer pin part and a radially inner pin part, which are connected to one another in a manner precluding relative rotation therebetween, wherein the radially outer pin part forms the bearing with the planet gear, and only the radially inner pin part is fixed at its axially forward end and axially rearward end to the axially forward and axially rearward carrier plates, respectively, wherein the axial forward end and axially rearward end of the radially outer pin part are connected respectively to the axially forward and axially rearward carrier plates to prevent relative rotation therebetween.

2. The planetary gear box according to claim 1, wherein the axially forward and axially reward ends of the radially outer pin part extend as far, respectively, to the axially forward and axially rearward carrier plates.

3. The planetary gear box according to claim 1, wherein the axially forward and axially rearward ends of the radially outer pin part are axially spaced apart from the respective axially forward and axially rearward carrier plates.

4. The planetary gear box according to claim 1, wherein the radially outer pin part includes an inner surface and an entire length of the inner surface rests against an outer surface of the radially inner pin part.

5. The planetary gear box according to claim 1, and further comprising at least one radially extending web rotationally fixedly connecting the radially inner pin part and the radially outer pin part.

6. The planetary gear box according to claim 5, wherein the at least one radially extending web includes at least two radially extending webs.

7. The planetary gear box according to claim 6, wherein at least two of the at least two radially extending webs form a cavity for holding at least one chosen from oil and components of an oil system.

8. The planetary gear box according to claim 6, wherein at least one radially extending web of the at least two radially extending webs is formed monolithically with the radially inner pin part, and at least one further radially extending web of the at least two radially extending webs is formed monolithically with the radially outer pin part.

9. The planetary gear box according to claim 5, wherein the at least one radially extending web is formed monolithically with the radially inner pin part.

10. The planetary gear box according to claim 5, wherein the at least one radially extending web is formed monolithically with the radially outer pin part.

11. The planetary gear box according to claim 5, wherein the at least one radially extending web is arranged symmetrically with respect to an axial center between the axially forward carrier plate and the axially rearward carrier plate.

12. The planetary gear box according to claim 1, wherein the radially inner pin part and the radially outer pin part are connected to one another in a manner precluding relative rotation therebetween by an interference fit.

13. The planetary gear box according to claim 1, wherein the radially inner pin part and the radially outer pin part are connected to one another in a manner precluding relative rotation therebetween by a positive engagement.

14. The planetary gear box according to claim 1, and further comprising a detection mechanism configured to detect, directly or indirectly, detect a relative movement between a respective pair of the radially inner pin part and the radially outer pin part.

15. The planetary gear box according to claim 14, wherein the detection mechanism includes a pressure gauge, which is configured to measure an oil pressure in an oil system that supplies oil to at least one of the bearings.

16. The planetary gear box according to claim 1, wherein the radially outer pin part and the radially inner pin part are at least one chosen from, composed of different materials and having had different heat treatment processes.

17. A gas turbine engine for an aircraft, which has:
an engine core which comprises a turbine, a compressor and a core shaft connecting the turbine to the compressor and formed as a hollow shaft;
a fan, which is positioned upstream of the engine core, wherein the fan comprises a plurality of fan blades and is driven by a fan shaft; and
the planetary gear box according to claim 1, an input of which is connected to the turbine shaft and an output of which is connected to the fan shaft.

18. A method for assembling a planetary gear box, comprising:
providing that the planetary gear box comprises:
a sun gear, which is driven by a sun shaft,
a plurality of planet gears, which are driven by the sun gear, wherein each of the planet gears has an inner axial opening,
a ring gear in engagement with the plurality of planet gears,
a plurality of planet pins, with each being of two-part configuration having a radially outer pin part and a radially inner pin part,
an axially forward carrier plate and an axially rearward carrier plate, wherein each of the planet pins is fixed at an axially forward end on the axially forward carrier plate and at an axially rearward end on the axially rearward carrier plate of the planetary gear box,
wherein axial forward and axially rearward ends of the radially outer pin part are connected respectively to the axially forward and axially rearward carrier plates to prevent relative rotation therebetween,
for each of the planet pins:
introducing the radially outer pin part into the inner axial opening of a respective one of the planet gears,
positioning the respective one of the planet gears between the axially forward carrier plate and the axially rearward carrier plate in the planetary gear box,
introducing the radially inner pin part into the radially outer pin part and fixing axially forward and axially rearward ends of the radially inner pin part respectively to the axially forward and axially rearward carrier plates.

19. A planetary gear box, comprising:
a sun gear, which rotates about an axis of rotation of the planetary gear box and is driven by a sun shaft, wherein the axis of rotation defines an axial direction of the planetary gear box,
a plurality of planet gears, which are driven by the sun gear, a ring gear in engagement with the plurality of planet gears, a plurality of planet pins, each arranged in one of the planet gears, respectively, with each planet pin and planet gear arrangement forming a bearing, and an axially forward carrier plate and an axially rearward carrier plate, wherein each of the planet pins is fixed at an axially forward end thereof on the axially forward carrier plate and at an axially rearward end thereof on the axially rearward carrier plate, wherein each of the planet pins is of two-part configuration, having a radially outer pin part and a radially inner pin part, which are connected to one another in a manner precluding relative rotation therebetween, wherein the radially outer pin part forms the bearing with the planet gear, and only the radially inner pin part is fixed at its axially forward end and axially rearward end to the axially forward and axially rearward carrier plates, respectively, at least one radially extending web rotationally fixedly connecting the radially inner pin part and the radially outer pin part, wherein the at least one radially extending web is formed monolithically with the radially inner pin part, wherein the at least one radially extending web radially spaces apart the radially inner pin part and the radially outer pin part such that there is an axially extending gap therebetween axially extending over a majority of an axial length of the radially outer pin part.

* * * * *